United States Patent
Kovach, III et al.

(10) Patent No.: US 11,998,142 B2
(45) Date of Patent: Jun. 4, 2024

(54) PORTABLE DRINK HOLDER

(71) Applicant: Anvil Technologies LLC, Wynnewood, PA (US)

(72) Inventors: Stephen J. Kovach, III, Wynnewood, PA (US); Richard Briganti, Bala Cynwyd, PA (US); Nham Dinh, Philadelphia, PA (US); Haoyang Chen, Philadelphia, PA (US); Tyler Bryant, Philadelphia, PA (US); Ardian Daku, Philadelphia, PA (US)

(73) Assignee: ANVIL TECHNOLOGIES LLC, Wynnewood, PA (US)

( * ) Notice: Subject to any disclaimer, the term of this patent is extended or adjusted under 35 U.S.C. 154(b) by 763 days.

(21) Appl. No.: 16/599,849

(22) Filed: Oct. 11, 2019

(65) Prior Publication Data

US 2020/0121130 A1 Apr. 23, 2020

Related U.S. Application Data

(60) Provisional application No. 62/748,322, filed on Oct. 19, 2018.

(51) Int. Cl.
*A47J 41/00* (2006.01)
*B65D 81/38* (2006.01)
*B65D 85/72* (2006.01)
*F25D 3/10* (2006.01)
*F25D 31/00* (2006.01)

(52) U.S. Cl.
CPC ........ *A47J 41/005* (2013.01); *B65D 81/3837* (2013.01); *B65D 85/72* (2013.01); *F25D 3/107* (2013.01); *F25D 31/002* (2013.01); *F25D 31/003* (2013.01)

(58) Field of Classification Search
CPC ... A47J 41/005; B65D 81/3837; B65D 85/72; F25D 3/107; F25D 31/002; F25D 31/003
See application file for complete search history.

(56) References Cited

U.S. PATENT DOCUMENTS

| 8,621,885 B1* | 1/2014 | Niebolte | F25D 3/08 |
| 2006/0260326 A1* | 5/2006 | Hickey | F25D 5/02 62/4 |
| 2009/0226588 A1* | 9/2009 | Marx | A23L 3/36 426/524 |
| 2015/0354885 A1* | 12/2015 | Rasmussen et al. | F25D 31/00 |
| 2015/0368024 A1* | 12/2015 | Bartek et al. | B65D 81/32 |
| 2018/0216875 A1* | 8/2018 | Caswell et al. | F25D 31/00 |

FOREIGN PATENT DOCUMENTS

CN 101932894 A * 12/2010 ............... F25D 9/00

OTHER PUBLICATIONS

CN101932894A Translation (Year: 2010).*

* cited by examiner

*Primary Examiner* — Elizabeth J Martin
*Assistant Examiner* — Dario Antonio Deleon
(74) *Attorney, Agent, or Firm* — Neil D. Gershon

(57) ABSTRACT

A portable drink holder for a drinkable liquid having a first removable reservoir for storing the liquid at a first end of the holder, a second removable reservoir at a second end of the holder for receiving the liquid and a cooling cartridge having a plurality of passageways for selectively transporting liquid from the first reservoir to the second reservoir. The cooling cartridge including a cooling medium so that the liquid transitions to a second temperature lower than the first temperature as it flows from the first reservoir to the second reservoir.

19 Claims, 34 Drawing Sheets

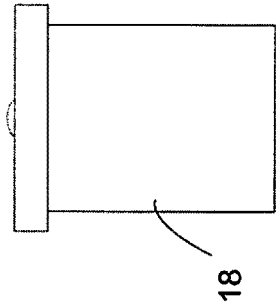
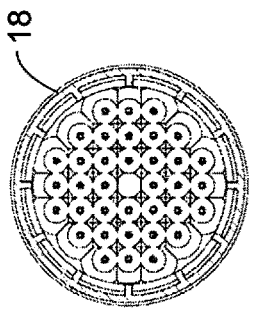
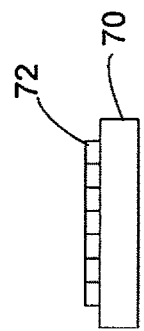
FIG 9 A
FIG 9 B
FIG 9 E
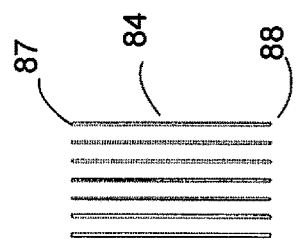
FIG 9 D
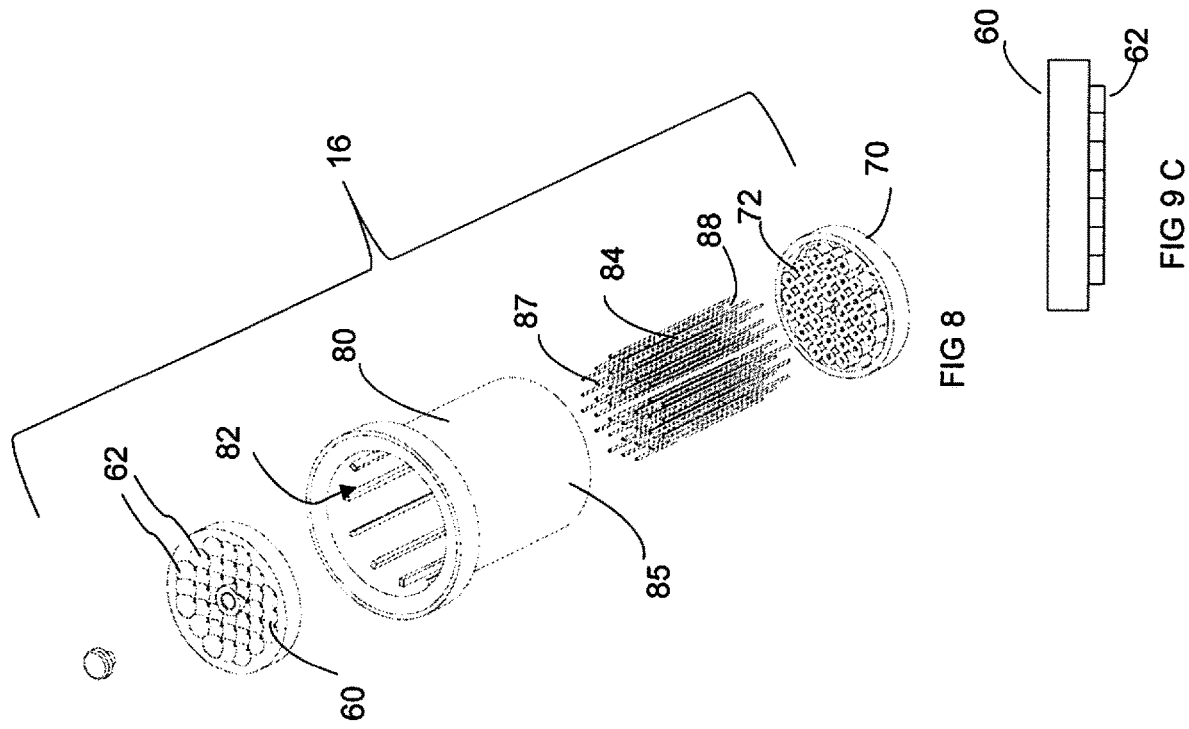
FIG 8
FIG 9 C

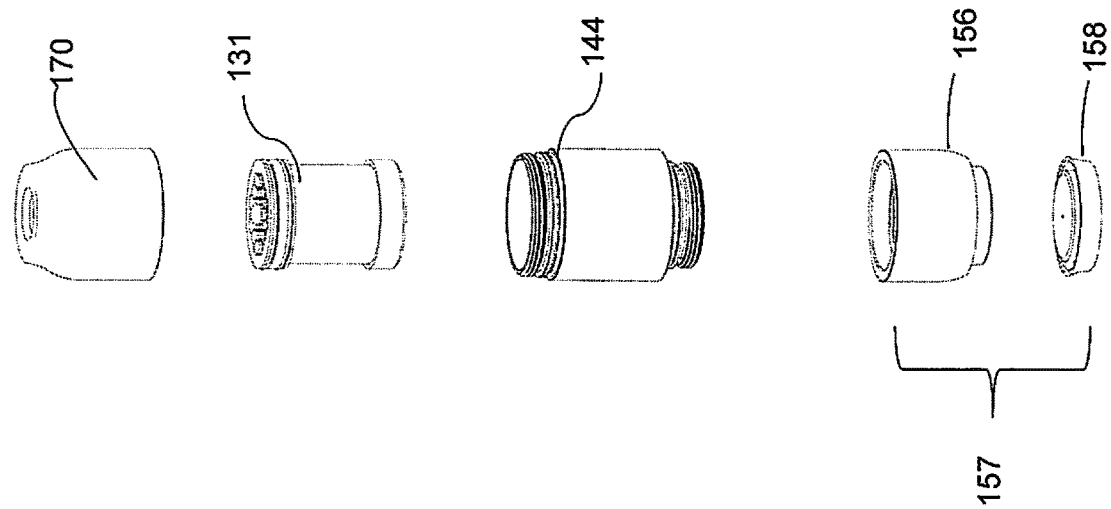
FIG 10 A
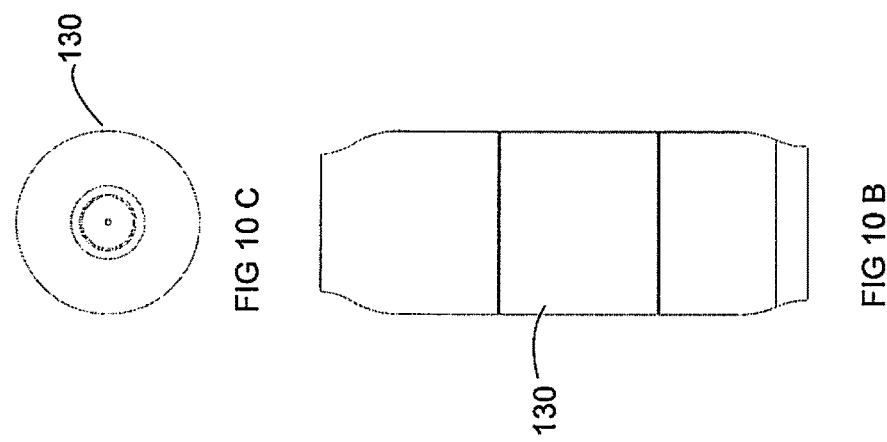
FIG 10 C
FIG 10 B

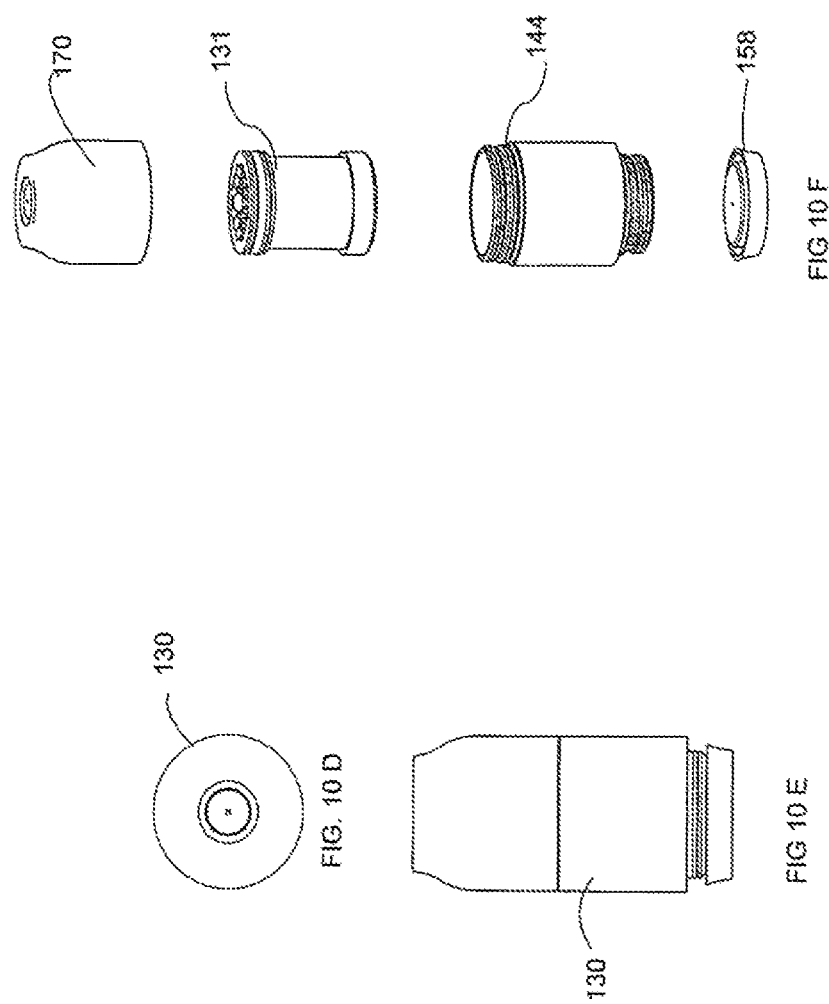

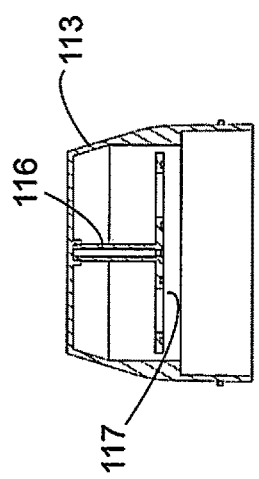
FIG 11 C
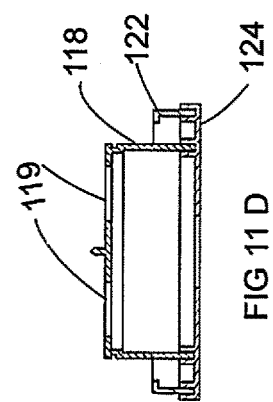
FIG 11 D
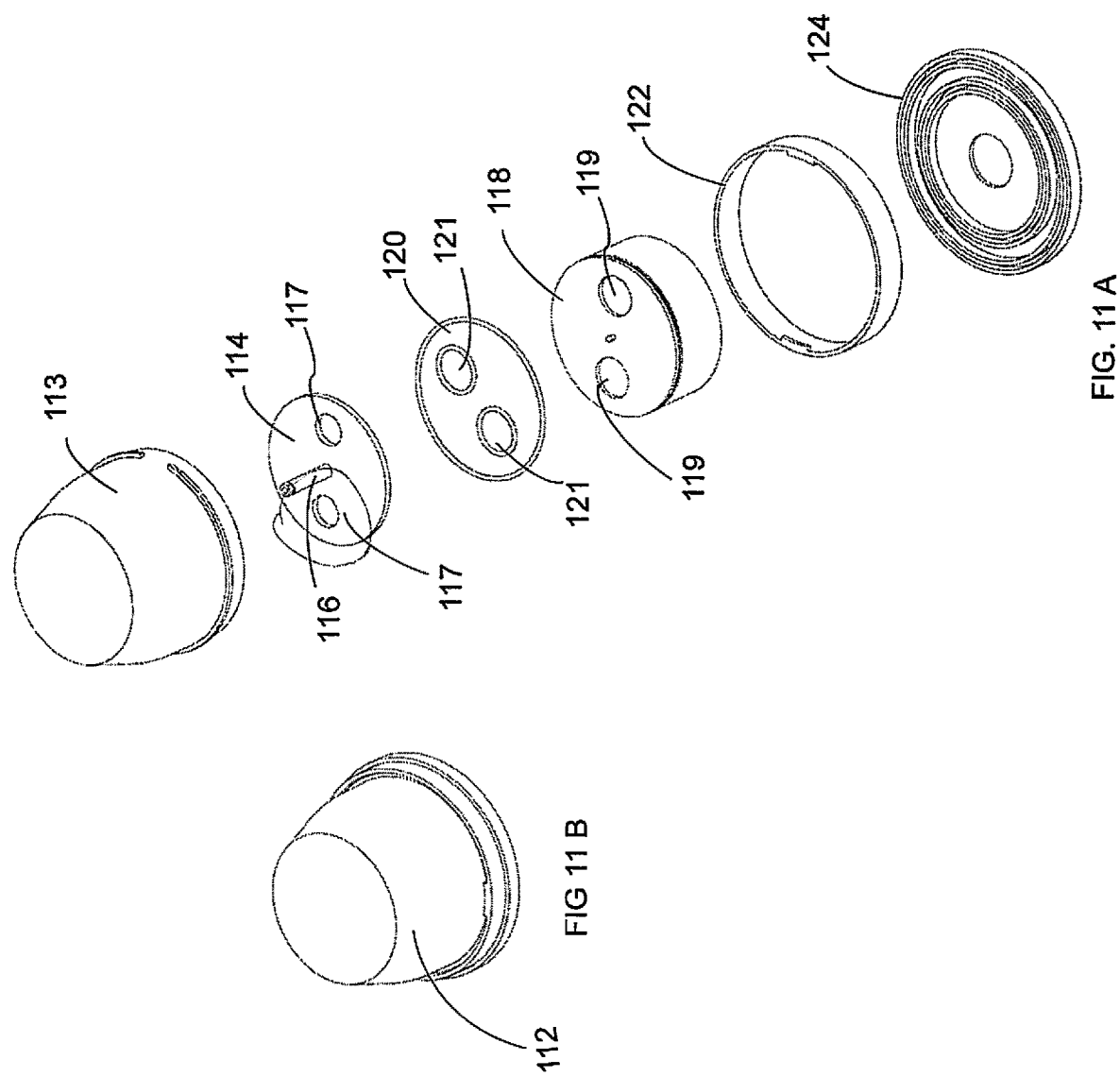
FIG. 11 A
FIG 11 B

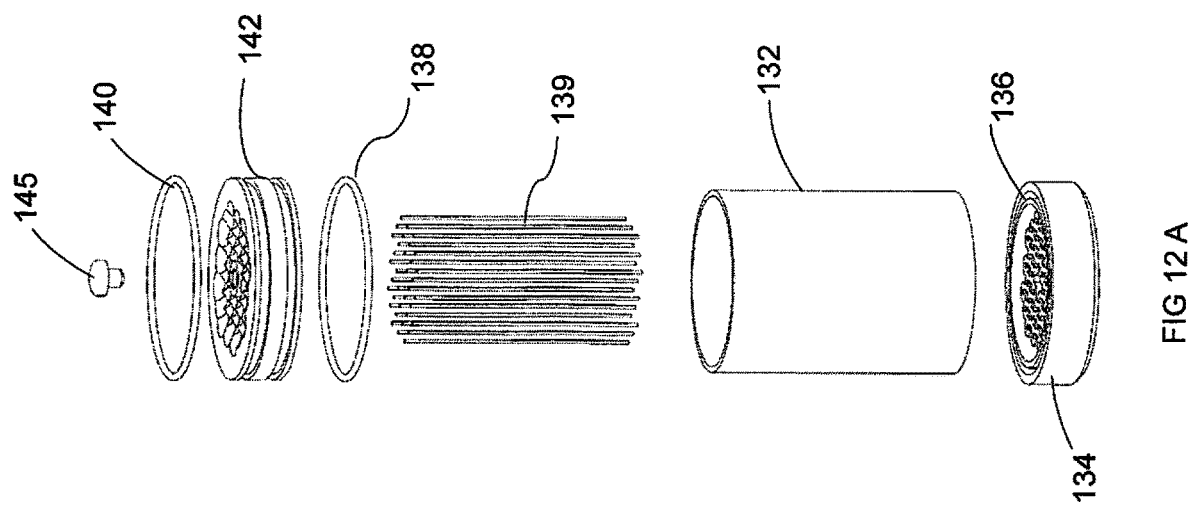
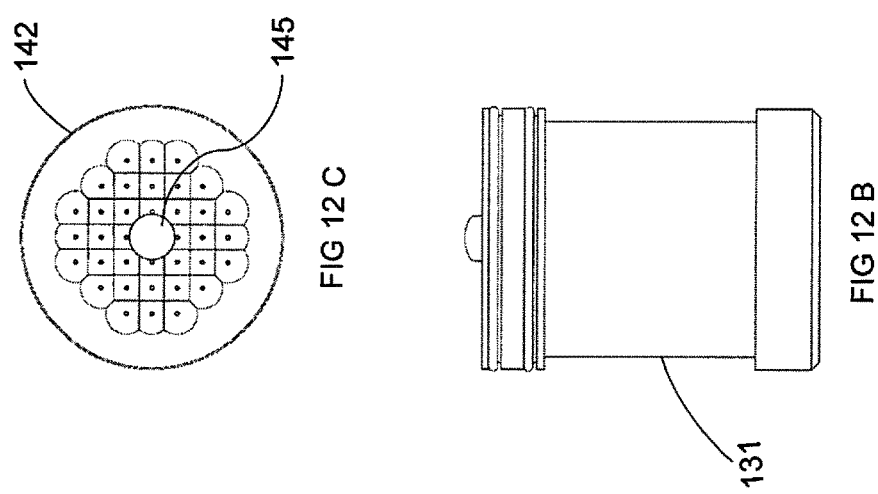

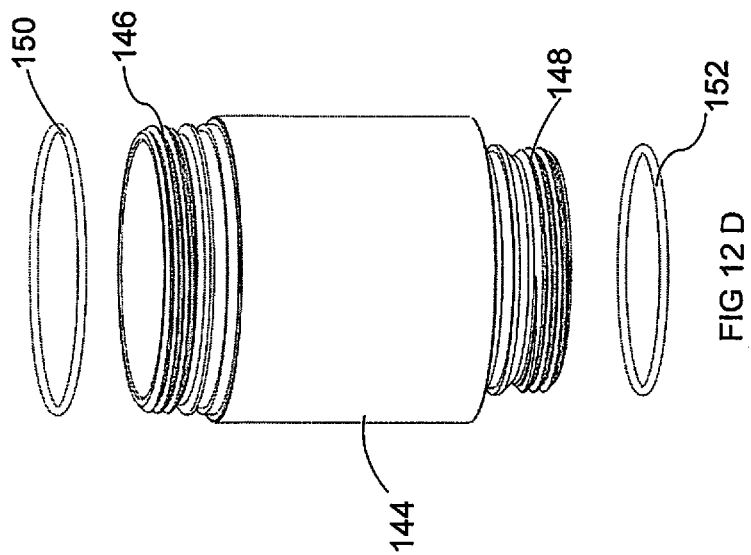
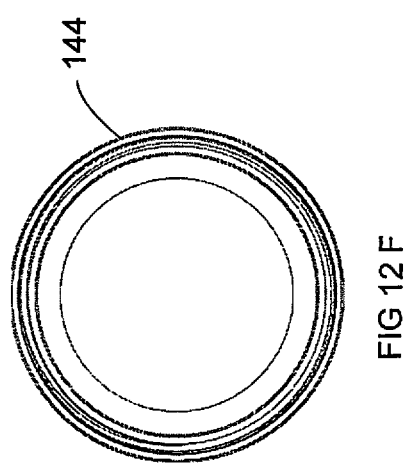
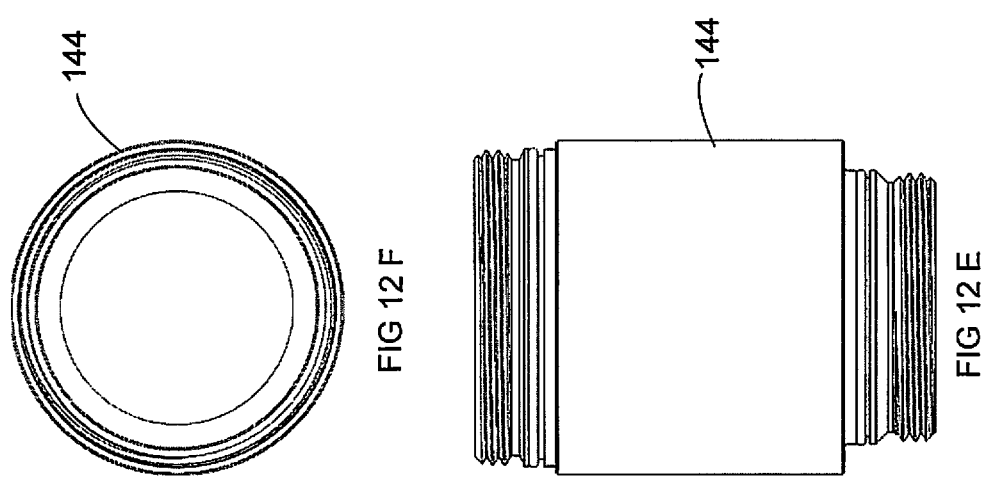

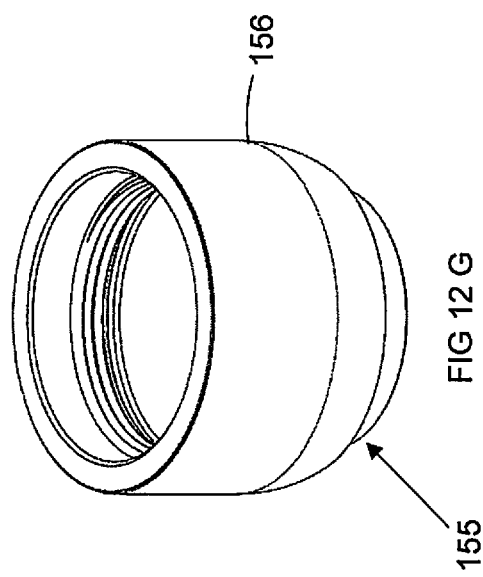
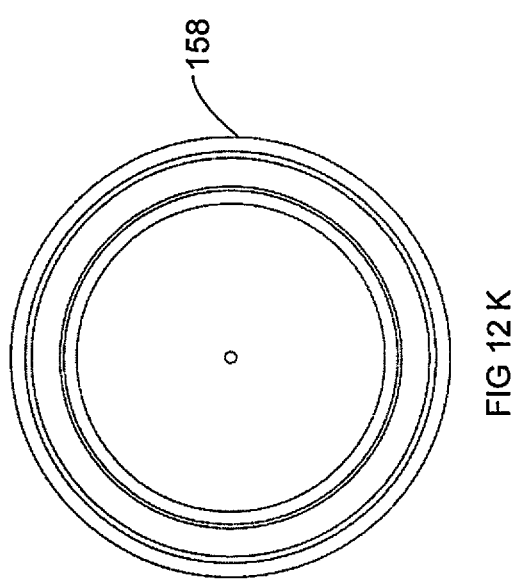
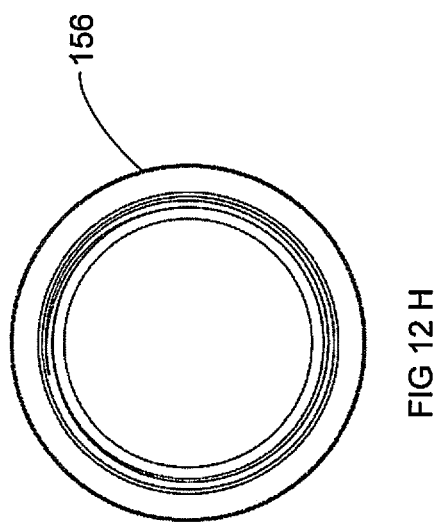

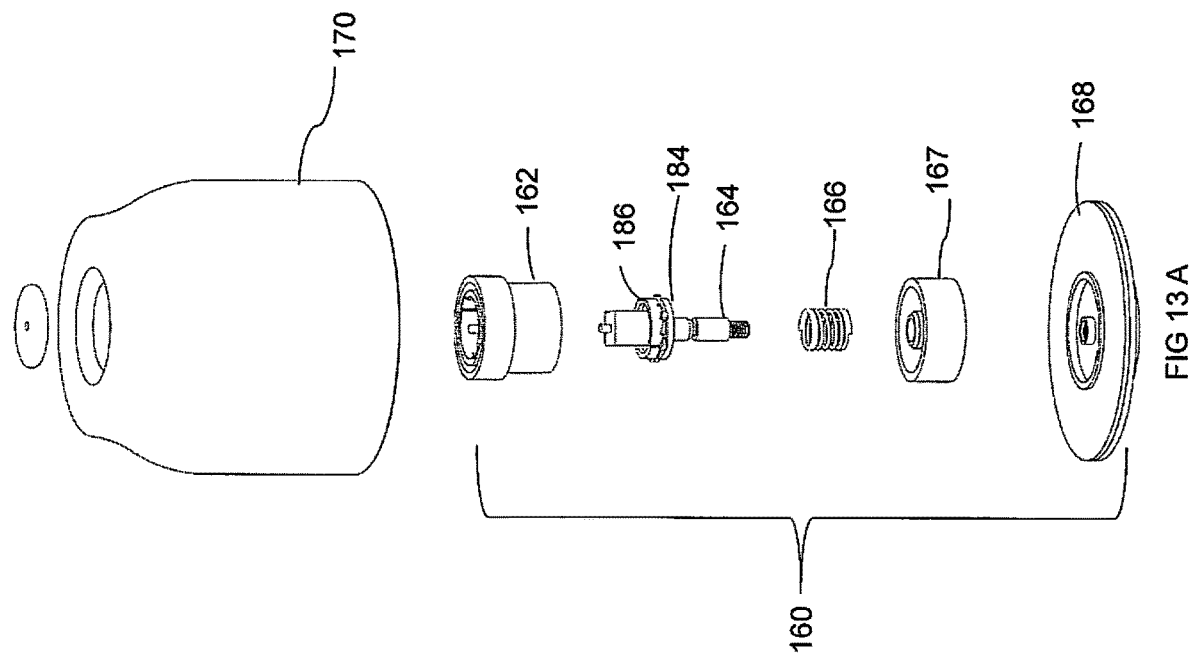
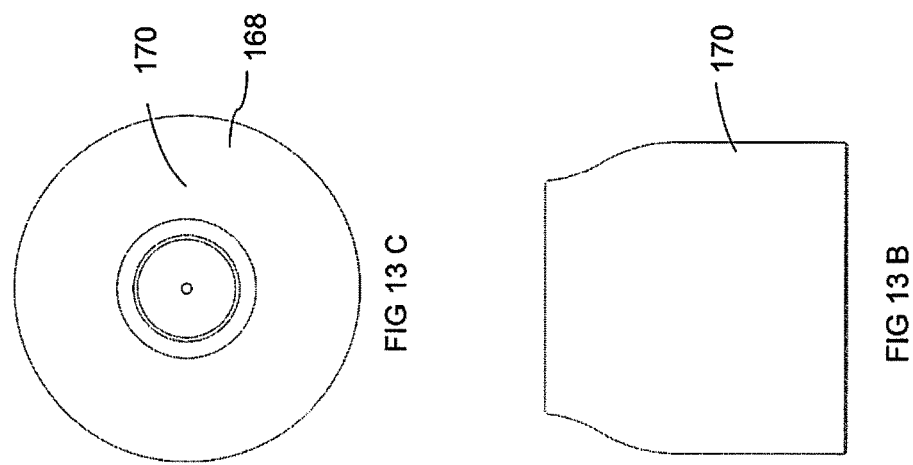

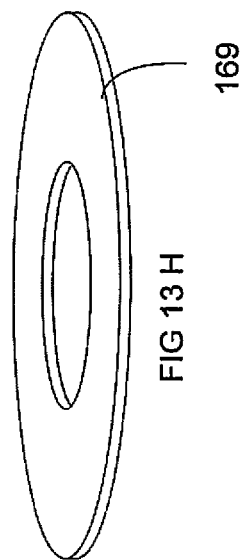
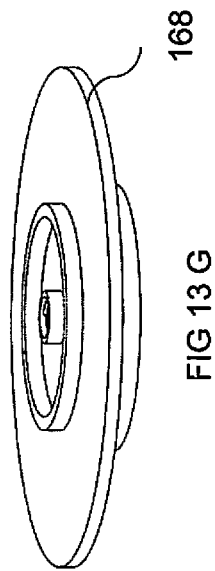

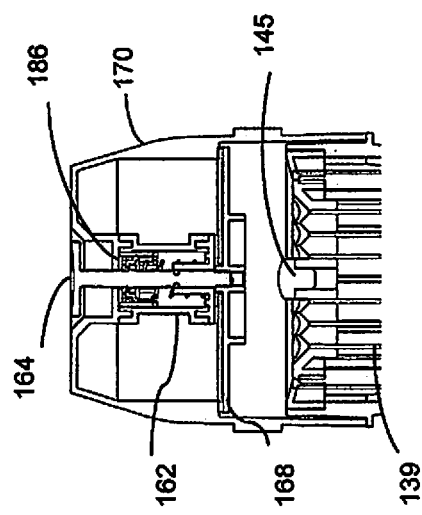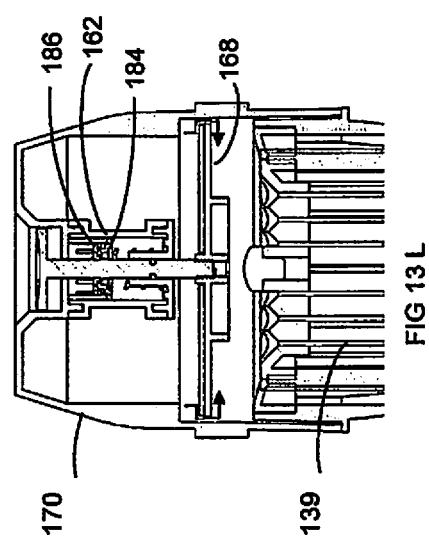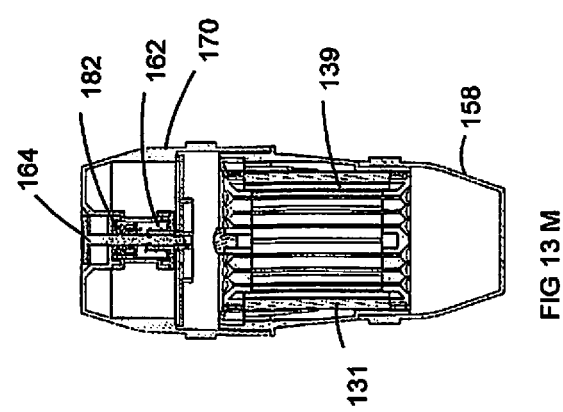

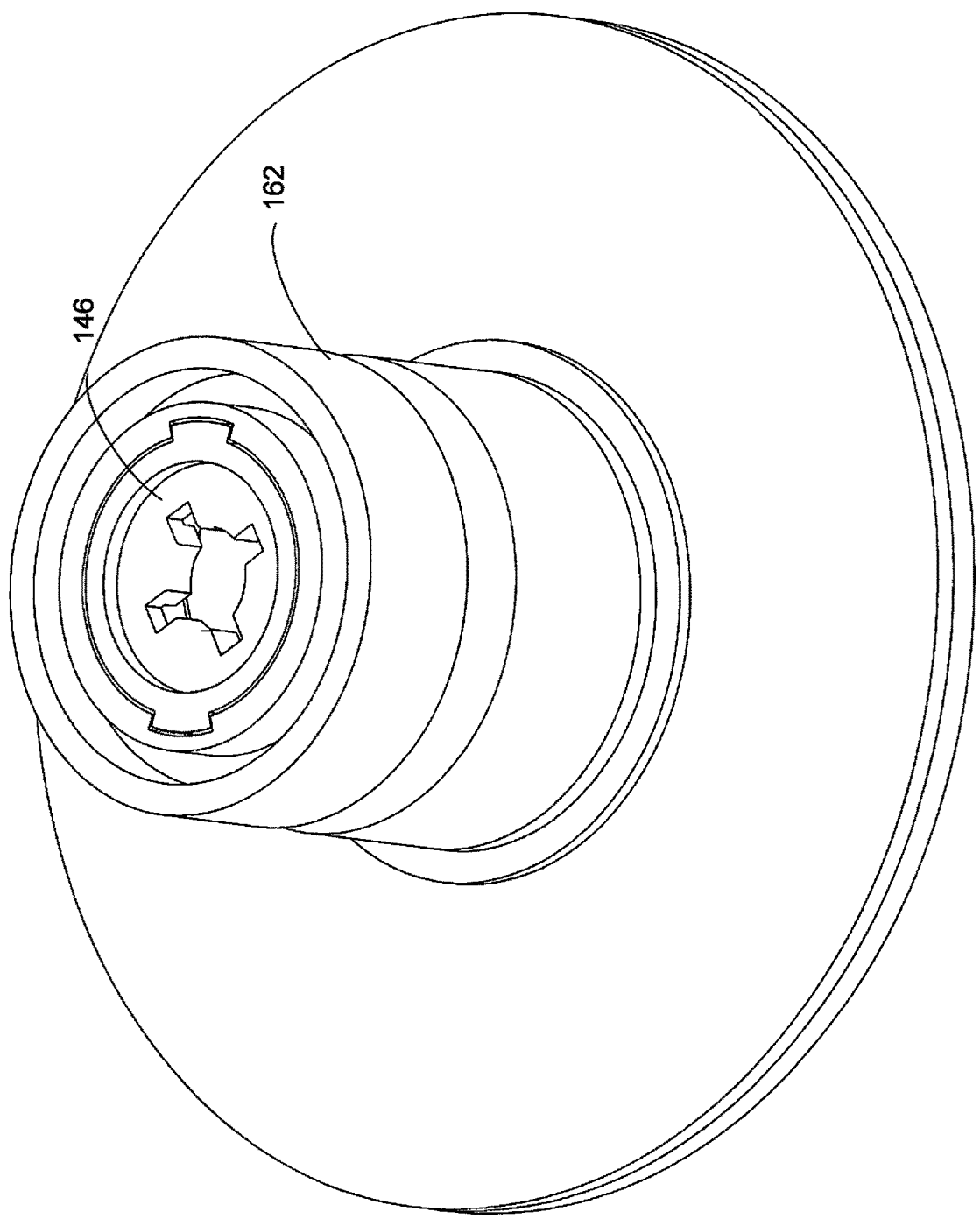

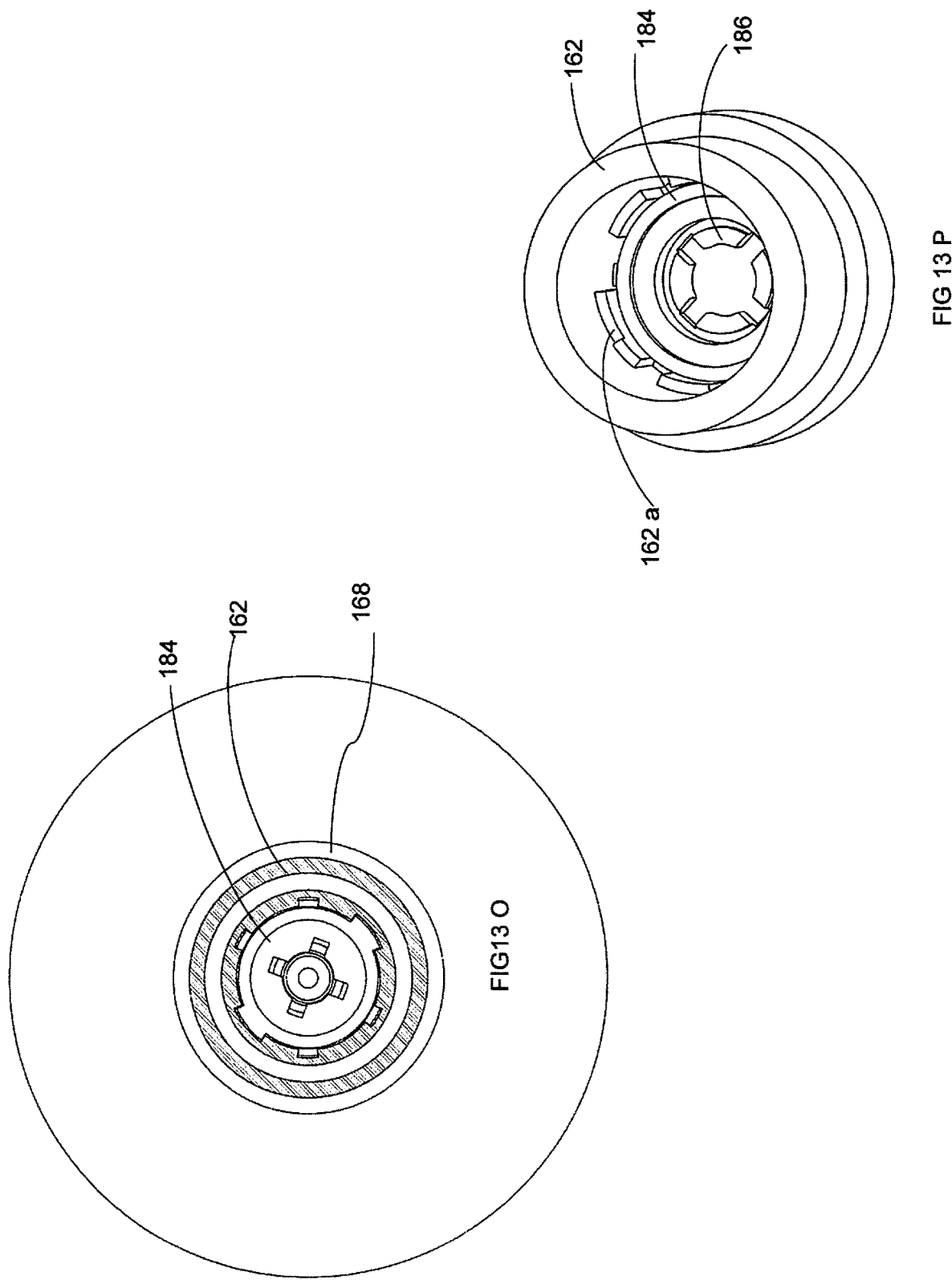

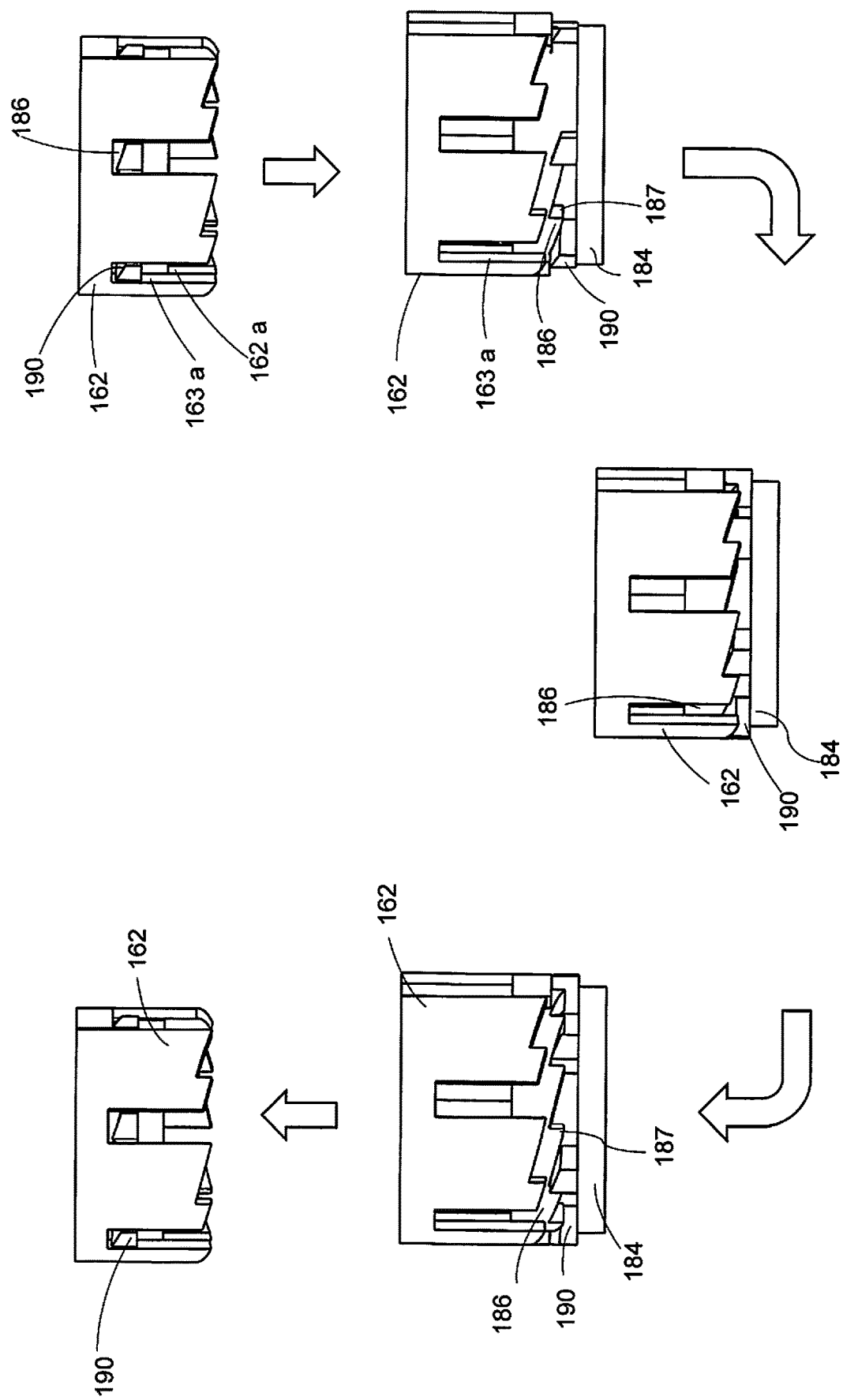

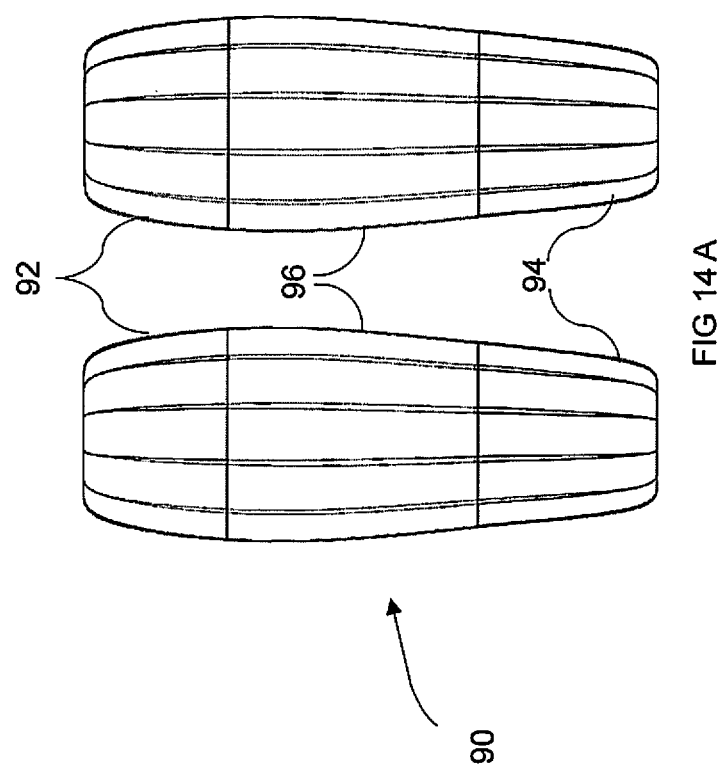

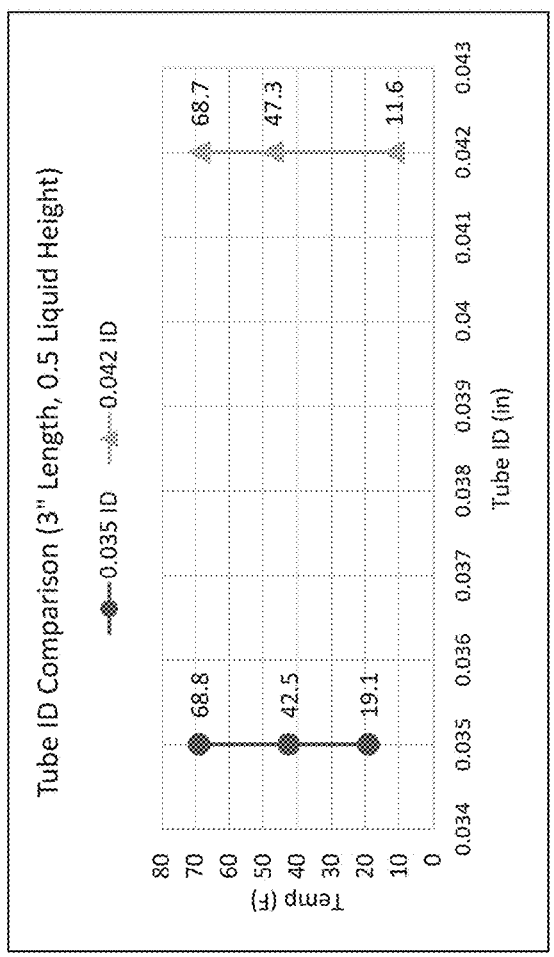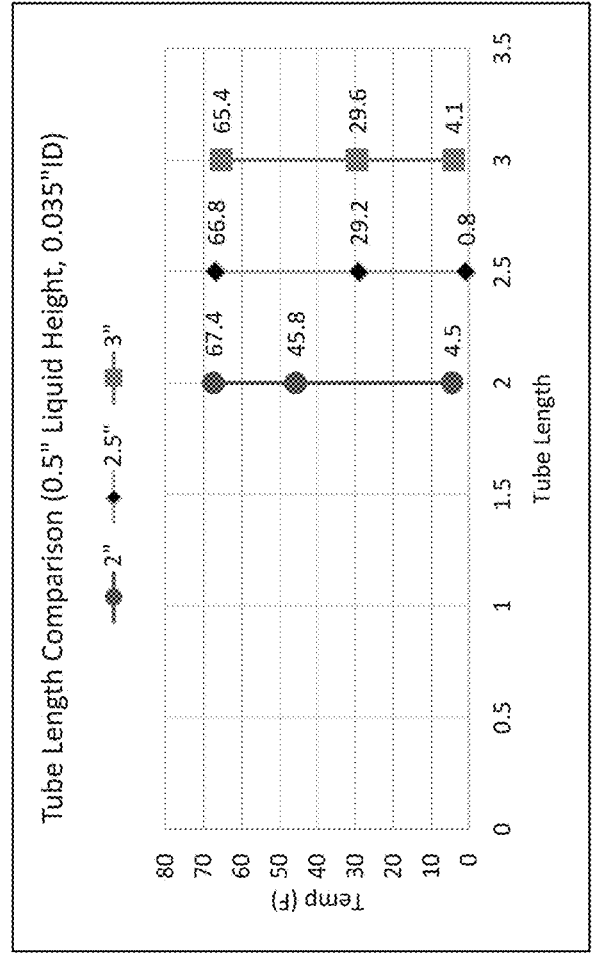

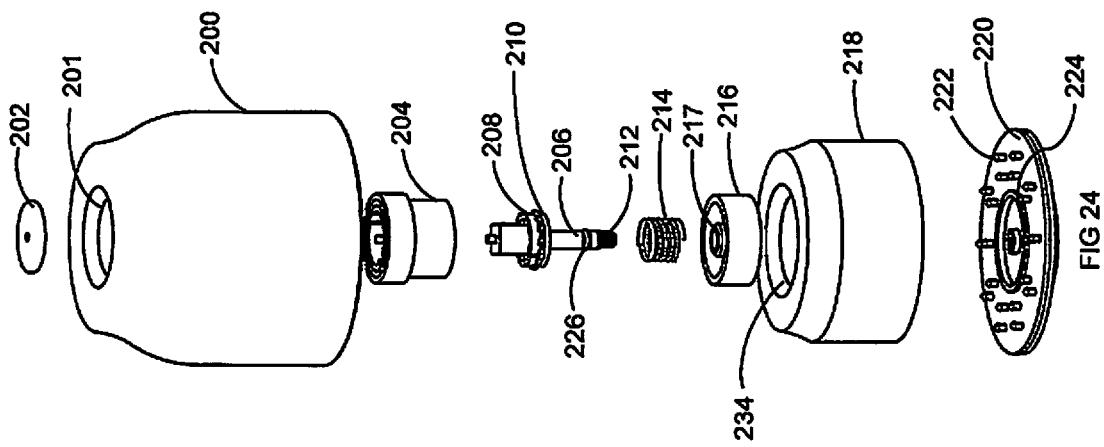
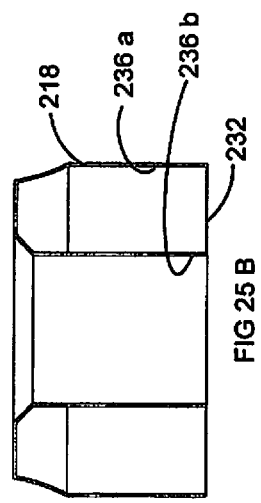
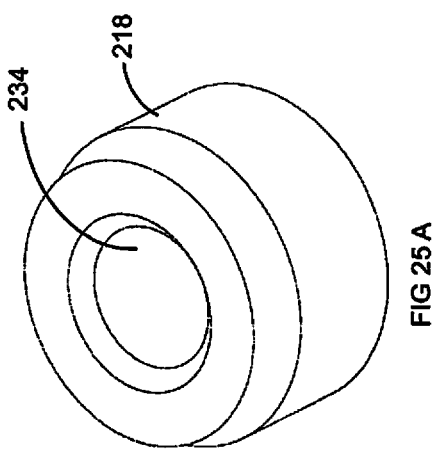

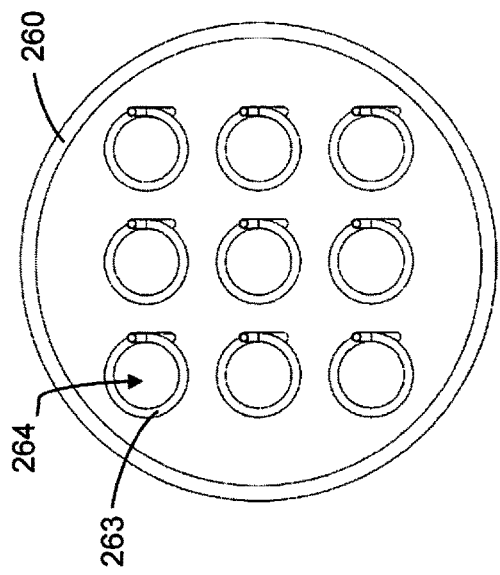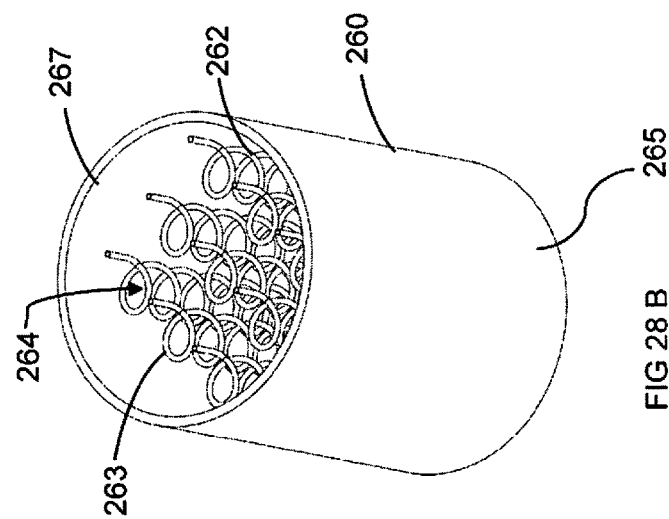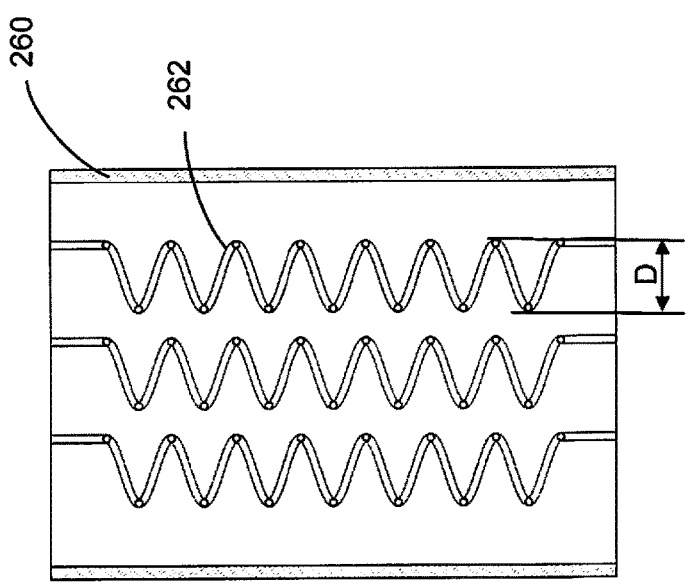

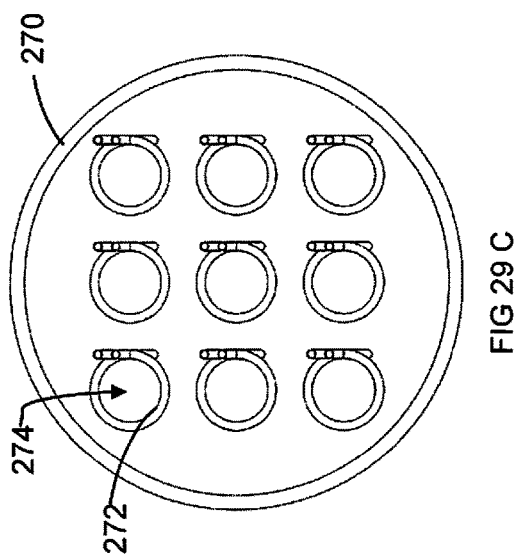
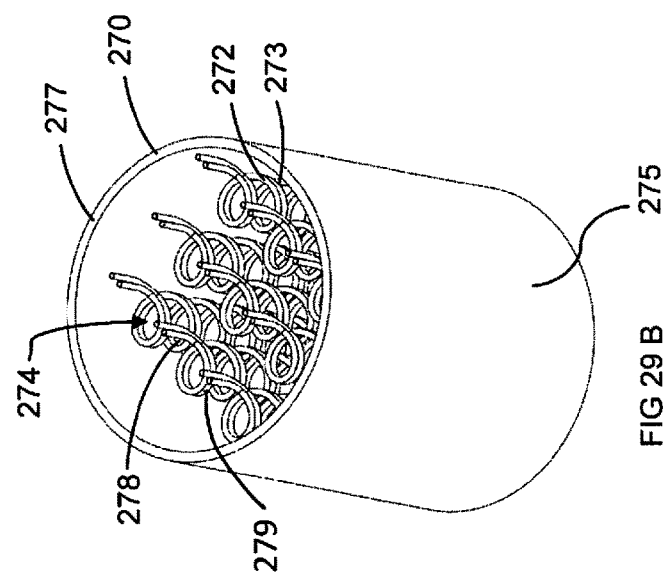
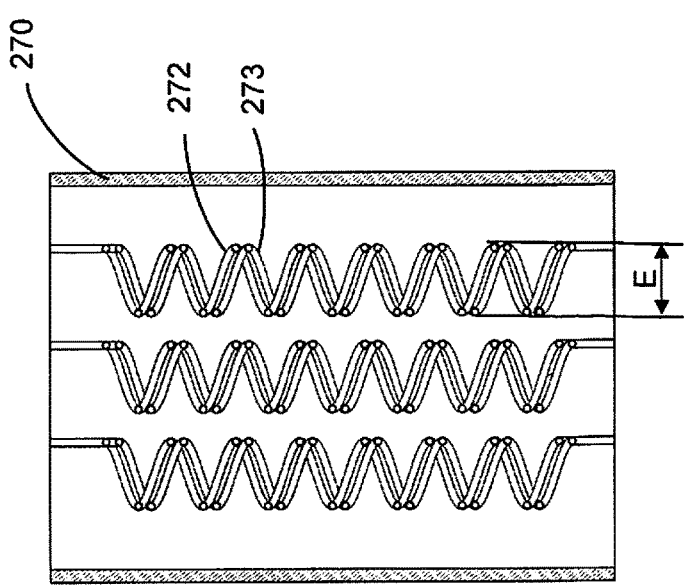

PORTABLE DRINK HOLDER

This application claims priority from provisional application Ser. No. 62/748,322, filed Oct. 19, 2018, the entire contents of which are incorporated herein by reference.

BACKGROUND

Technical Field

This application relates to a portable drink holder, and more particularly, to a portable drink holder which selectively cools the drink within the holder.

Background of Related Art

Currently, thermoses are used to maintain cold temperature of a liquid. These thermoses are portable and can be brought to various events to provide a cold drink. However, the thermos functions to maintain the cold temperature of the drink, requiring the drink to first be cooled, i.e., refrigerated, prior to pouring into the thermos. Current coolers also enable drinks to be cooled, however, the drinks are typically placed in the cooler after being cooled.

It would be advantageous to provide a drink holder that can cool the liquid in situ to provide a cold drink when desired by the user. This could have special use in providing a cooled alcoholic cocktail. It would also be advantageous if such drink holder was portable for bringing to restaurants, sporting events and other activities. It would further also be advantageous if such drink holder could have a separate holder for the liquor and for the ingredients to be mixed with the liquor at a selected time by the user to provide a cooled cocktail.

SUMMARY

The present invention overcomes the problems and deficiencies of the prior art. The present invention provides a portable drink holder which lowers the temperature of the drink at the selected time by the user. The drink is carried within the holder and the user opens a receptacle/reservoir to allow flow through the cooling system into a drinking cup. Due to its portability, the drink holder can be brought to restaurants, sporting events, social gatherings, etc. to provide cooled drinks. The portable drink holder is preferably used for alcoholic beverages to thereby provide a portable cocktail shaker, but can also be used for non-alcoholic beverages.

In accordance with one aspect of the present invention, a portable drink holder for a drinkable liquid is provided comprising a first removable reservoir for storing a liquid at a first end of the holder at a first temperature, a second removable reservoir at a second end of the holder for receiving the liquid and a cooling cartridge between the first and second reservoirs in fluid communication with the first and second reservoirs. The cooling cartridge includes a cooling medium so that the liquid transitions to a second temperature lower than the first temperature as it flows from the first reservoir to the second reservoir.

In some embodiments, the cooling cartridge has a plurality of tubes for transporting liquid from the first reservoir to the second reservoir. In other embodiments, the cooling cartridge has one or more coils for transporting liquid from the first reservoir to the second reservoir. In some embodiments, the coils are longitudinally aligned and parallel; in other embodiments, the coils are longitudinally aligned and concentric.

The drink holder can in some embodiments include an insulating sleeve, wherein the cooling cartridge is positioned within the insulating sleeve to limit the temperature rise of the cooling medium.

In some embodiments, the first reservoir is removably securable to one of the cooling cartridge or insulating sleeve which is positioned around the cooling cartridge and the second reservoir is removably securable to one of the cooling cartridge or insulating sleeve which is positioned around the cooling cartridge.

In some embodiments, the cooling medium is a gel concentrate having a temperature of zero degrees or less and the gel concentrate maintains a temperature transition from the first reservoir to the second reservoir so the temperature transitions from about 65-75 degrees Fahrenheit to about 25-35 degrees Fahrenheit. The tubes or coils can provide passageways through the cooling medium.

In some embodiments, the holder can be inverted to pass the liquid from the second reservoir back through the plurality of tubes or coils to the first reservoir to further cool the liquid.

In some embodiments, the first reservoir has a seal preventing passage of the liquid from the first reservoir into the cooling cartridge, the seal selectively openable to allow passage from the first reservoir into the cooling cartridge. In some embodiments, the seal includes a cover rotatable to align holes in the cover with openings in the plurality of tubes. In some embodiments, a push button mechanism opens the seal. A vent can be provided for venting during passage from the first reservoir. In some embodiments, the liquid is contained in pods in the first reservoir which are puncturable for liquid flow.

In some embodiments, the plurality of tubes have proximal openings closer to the first reservoir and distal openings closer to the second reservoir, and the cooling cartridge includes a top cover, the top cover having a plurality of funnels to align with proximal openings in the tubes to funnel the liquid from the first reservoir into the cooling cartridge. The bottom cover in some embodiments can have a plurality of funnels to align with the distal openings in the plurality of tubes to funnel the liquid from the second reservoir into the plurality of tubes.

The drink holder can be composed of reusable materials such as stainless steel or alternatively composed of disposable materials.

In accordance with another aspect of the present invention, a portable drink holder for altering temperature of a liquid prior to drinking the liquid is provided comprising a cooling cartridge having a proximal end, a distal end and a cooling medium. A first reservoir for storing the liquid at a first temperature at a proximal end of the holder is removably mountable at the proximal end of the holder and in fluid communication with the proximal end of the cooling cartridge. A second reservoir is removably mountable at a distal end of the holder, wherein the liquid is transportable from the first reservoir through the cooling cartridge into the second reservoir, the first temperature of the liquid lowered to a second temperature by the cooling cartridge for passage into the second reservoir. The liquid is further transportable from the second reservoir back through the cooling cartridge and into the first reservoir to further lower the temperature of the liquid.

In some embodiments, the cooling cartridge has one or more tubes extending therein for passage of the liquid from the first reservoir to the second reservoir, which can be independent so they are not in fluid communication with one another. In some embodiments, the cooling cartridge has one or more coils extending therein for passage of the liquid from the first reservoir to the second reservoir, which can be independent so they are not in fluid communication with one another. An insulating sleeve is preferably provided surrounding at least a portion of the cooling cartridge. The liquid can in some embodiments be subsequently transportable from the first reservoir back through the tubes or coils of the cooling cartridge and back into the second reservoir to further lower the temperature of the liquid. In some embodiments, the cooling cartridge includes a series of proximal funnels to funnel the liquid into the tubes (or coils) from the first reservoir and/or a series of distal funnels to funnel the liquid from the tubes (or coils) into the second reservoir into the tubes. In some embodiments, the first reservoir and the second reservoir each form a drinking cup for the liquid.

In accordance with another aspect of the present invention, a portable drink holder for adjusting temperature of a liquid for drinking is provided comprising a cooling cartridge having a proximal end, a distal end, and a plurality of longitudinally extending passageways, in the form of tubes or coils, and a cooling medium around the passageways. A first reservoir is removably mountable at the proximal end of the holder and a second reservoir is removably mountable to a second end of the holder, wherein the liquid is capable of being passed back and forth from one of the first and second reservoirs to the other of the first and second reservoirs via passage through the plurality of passageways, wherein each passage of the fluid through the plurality of passageways lowers the temperature of the liquid so the temperature of the liquid can be adjusted in situ to a desired temperature for drinking.

In preferred embodiments, an insulating sleeve is positioned around at least a portion of the cooling cartridge. The first reservoir, in some embodiments, includes a seal selectively openable to enable passage of the liquid from the first reservoir into the plurality of tubes or coils. A vent can be provided for venting during pouring of the liquid.

In accordance with another aspect of the present invention, a method for cooling a drinkable liquid in situ is provided comprising the steps of:
providing a holder having a first removable reservoir for storing the liquid, a second removable reservoir for receiving the liquid and a cooling cartridge containing a cooling medium interposed between the first and second reservoirs;
opening a seal in the first reservoir to enable flow of the liquid from the first reservoir through the cooling cartridge to lower the temperature of the liquid and into the second reservoir; and
removing the second reservoir from the holder to expose a receptacle in the second reservoir for drinking of the liquid.

In some embodiments, passage of the liquid into the second reservoir mixes the liquid with the contents in the second reservoir. In some embodiments, passage of the liquid though the cooling cartridge comprises the step of passing the liquid through a plurality of tubes longitudinally arranged in the cooling cartridge. In some embodiments, passage of the liquid though the cooling cartridge comprises the step of passing the liquid through a plurality of coils longitudinally arranged in the cooling cartridge. The method can further include in some embodiments, the step of further cooling the liquid after passage into the second reservoir by passing the liquid from the second reservoir back through the cooling system and into the first reservoir.

In some embodiments, the step of opening a seal in the first reservoir includes rotating a sealing member to align a plurality of openings in the seal with a plurality of openings in the tubes or coils extending through the cooling cartridge. In other embodiments, a push button mechanism opens the seal.

In some embodiments, the first reservoir is vented when the seal is open and liquid flows from the first reservoir.

In some embodiments, the holder includes an insulating sleeve.

BRIEF DESCRIPTION OF THE DRAWINGS

FIG. 8 is an exploded perspective view of the cooling cartridge of the drink holder of FIG. 1;

FIG. 9A is a side view of the cooling cartridge of FIG. 8;

FIG. 9B is a cross-sectional view of the cooling cartridge of FIG. 8;

FIG. 9C is a side view of the top cap of the cooling cartridge of FIG. 8;

FIG. 9D is a side view of the tubes of the cooling cartridge of FIG. 8;

FIG. 9E is a side view of the bottom cap of the cooling cartridge of FIG. 8;

FIG. 10A is an exploded view of an alternate embodiment of the drink holder of the present invention;

FIG. 10B is a side view of the assembled drink holder of FIG. 10A;

FIG. 10C is a top view of the drink holder of FIG. 10B;

FIG. 10D is an exploded view of an alternate embodiment of the drink holder of the present invention;

FIG. 10E is a side view of the assembled drink holder of FIG. 10D;

FIG. 10F is a top view of the drink holder of FIG. 10D;

FIGS. 11A-11D illustrate an alternate embodiment of the top reservoir of the present invention wherein:

FIG. 11A is an exploded view of the top reservoir;

FIG. 11B is a perspective view of the top reservoir;

FIG. 11C is a cross-sectional view of the cup holder of the top reservoir;

FIG. 11D is a cross-sectional view of the opening mechanism of the top reservoir; and FIGS. 12A-13R illustrate components of the embodiment of the drink holder of FIG. 10A wherein:

FIG. 12A is an exploded view of the cooling cartridge;

FIG. 12B is a side view of the cooling cartridge of FIG. 12A;

FIG. 12C is a top view of the cooling cartridge of FIG. 12A;

FIG. 12D is a side view of the insulating sleeve showing the O-ring seals prior to attachment to the sleeve;

FIG. 12E is a side view of the insulating sleeve of FIG. 12D;

FIG. 12F is a top view of the insulating sleeve of FIG. 12D;

FIG. 12G is a perspective view of the bottom reservoir;

FIG. 12H is a top view of the bottom reservoir of FIG. 12G;

FIG. 12I is a side view of the bottom reservoir of FIG. 12G;

FIG. 12J is perspective view of the cooling plug for the bottom reservoir of FIG. 12G;

FIG. 12K is a top view of the cooling plug of FIG. 12J;

FIG. 13A is an exploded view of the top reservoir and sealing mechanism;

FIG. 13B is a side view of the top reservoir of FIG. 13A;

FIG. 13C is a top view of the top reservoir of FIG. 13A;

FIG. 13D is an exploded view of the push button of the sealing mechanism of FIG. 13A;

FIG. 13E is a side view of the push button of FIG. 13D;

FIG. 13F is a top view of the push button of FIG. 13D;

FIG. 13G is a perspective view of the disk seal of the sealing mechanism of FIG. 13C;

FIG. 13H is a perspective view of the gasket of the disk seal of FIG. 13G;

FIG. 13I is a side view of the assembled disk and gasket of FIGS. 13G and 13H;

FIG. 13J is a top view of the assembled disk and gasket of FIGS. 13G and 13H;

FIG. 13K is a side view with the flow opening mechanism in the closed position;

FIG. 13L is a view similar to FIG. 13K showing the flow opening mechanism in the open position to allow liquid flow from the top reservoir into the cooling cartridge;

FIG. 13M is a side view of the drink holder showing internal components;

FIG. 13N is a top perspective of the components of the sealing mechanism for the top reservoir;

FIG. 13O is a top view of the components of FIG. 13N;

FIG. 13P is an underside view of the components of FIG. 13N;

FIG. 13Q is a perspective view of the components of the sealing mechanism for the top reservoir;

FIG. 13R illustrates the steps of opening the seal mechanism to enable fluid flow from the top reservoir into the cooling cartridge;

FIG. 15 is a chart comparing tubes internal diameter and temperature;

FIG. 16 is a chart comparing tube length and temperature;

FIG. 24 is an exploded view of the top reservoir of an alternate embodiment of the present invention;

FIG. 25A is a perspective view of the pod of FIG. 24 containing the liquid, e.g., liquor;

FIG. 25B is a side view of the pod of FIG. 24;

FIGS. 26A-26C are cross-sectional views of the sealing mechanism of FIG. 21 showing its use wherein FIG. 26A illustrates the pod inserted into the top reservoir and the needles spaced from the pod; FIG. 26B illustrates the push button depressed so the needles penetrate the pod; and FIG. 26C illustrates the push button depressed a second time so the fluid flows through the holes;

FIG. 26D is an enlarged view of the area of detail of FIG. 26A illustrating the needles;

FIG. 28A is a side view of coils to provide passageways for fluid from the top reservoir in accordance with an alternate embodiment of the present invention;

FIG. 28B is a perspective view of the cooling cartridge and coils of FIG. 25A;

FIG. 28C is a top view of the coils of FIG. 25A;

FIG. 29A is a side view of another embodiment of coils of the present invention to provide passageways for fluid from the top reservoir;

FIG. 29B is a perspective view of the cooling cartridge and coils of FIG. 29A;

FIG. 29C is a top view of the coils of FIG. 29A;

DETAILED DESCRIPTION OF PREFERRED EMBODIMENTS

Figure 3:
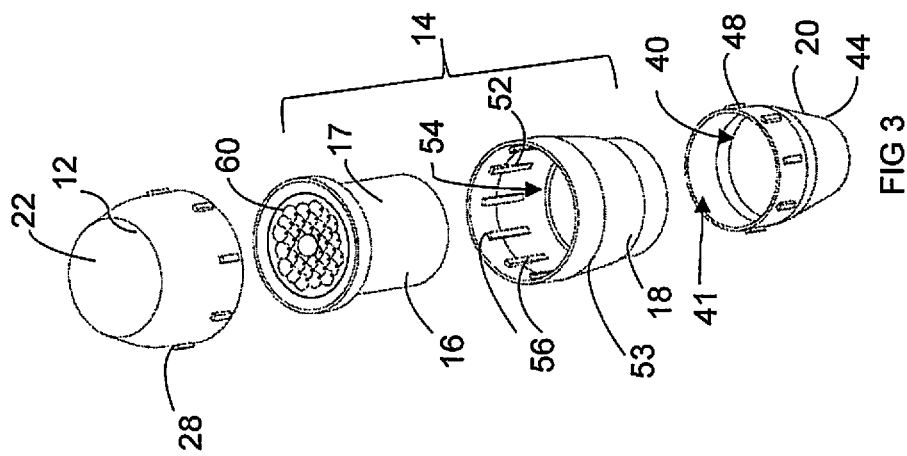
FIG. 3 is a perspective view of the drink holder of FIG. 1 showing the components separated.

The cocktail shaker of the present invention provides a portable drink holder which lowers the temperature of the drink at the selected time by the user. The drink, e.g., an alcoholic beverage, is carried within a sealed receptacle of the drink holder and the user opens the receptacle when desired to allow flow of the liquid through the cooling system of the drink holder and into another receptacle which forms a drinking cup. That is, the drink (liquid) is contained within the drink holder (shaker) at a first temperature, e.g., room temperature, and when desired, is passed through the cooling system of the drink holder to cool the liquid, e.g., alcohol, to a reduced temperature to provide a cooled drink, e.g. a cooled cocktail, in a cocktail-like glass. The receptacle which forms the drinking glass can also contain ingredients such as a garnish, e.g., a cherry, lemon, etc., which mixes with the cooled liquid to provide the cocktail. In this manner, a cooled cocktail can be made at the site. The drink holder is light weight and portable so it can be brought to restaurants, sporting events, social gatherings, and other locations/events to provide cooled drinks.

The drink holder (cocktail shaker) can be composed of non-disposable materials, such as stainless steel wherein it can be washed and reused after use, or alternatively, composed of disposable materials wherein it is discarded after use. Both of these versions/embodiments are discussed in detail below.

Referring now in detail to the drawings wherein like reference numerals identify similar or like components throughout the several views, FIGS. 1-9E show one embodiment of the cocktail shaker of the present invention. The cocktail shakers disclosed herein are also referred to herein as drink holders, and since the shakers are portable, also referred to herein as portable shakers or portable drink holders. The drink holder is designated generally by reference numeral 10 and includes a top reservoir 12, a bottom reservoir 20 and a cooling system 14 between the top reservoir 12 and bottom reservoir 20 to thereby form a middle or intermediate cooling section. The cooling system 14 includes a cooling cartridge 16 and an insulating sleeve 18 which encircles the cooling cartridge 16 to help maintain the cold temperature of the cooling cartridge 16. The top reservoir 12 holds a liquid (drink such as alcohol) at a first temperature, e.g., room temperature, the cooling system 14 cools the liquid to a lower temperature as the liquid passes through the cooling system 14, and the bottom reservoir 20 receives the cooled liquid (drink) from the cooling system 14 and forms a drinking cup for the liquid, e.g., cocktail.

Figure 2:
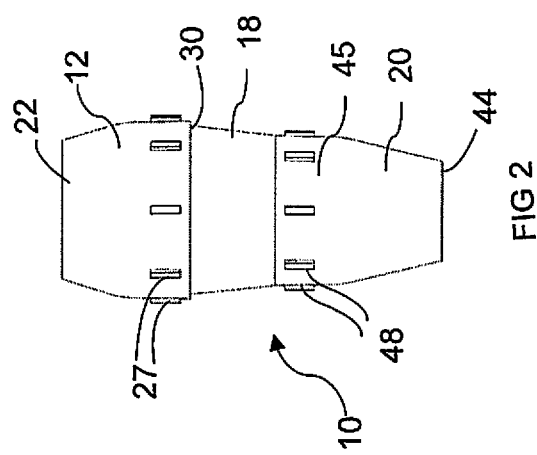
FIG. 2 is a side view of the drink holder of FIG. 1 shown with the components assembled.
Figure 1:
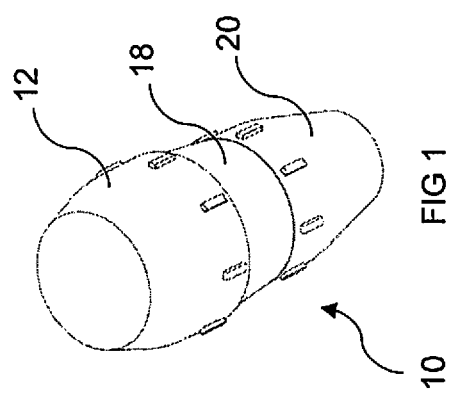
FIG. 1 is a perspective view of a first embodiment of the drink holder of the present invention shown with the components assembled.
Figure 4:
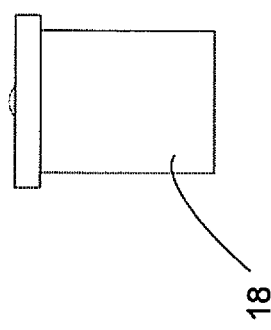
FIG. 4 is a side view of the top reservoir of the drink holder of FIG. 1.
Figure 5:
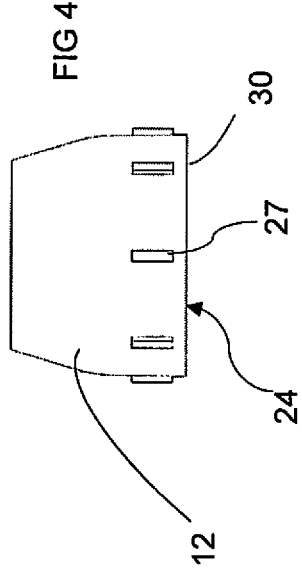
FIG. 5 is a side view of the cooling cartridge of the cooling system of the drink holder of FIG. 1.
Figure 7:
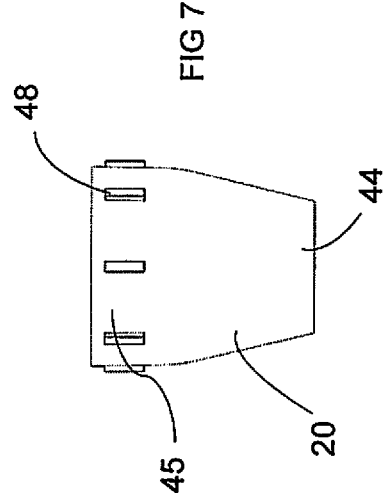
FIG. 7 is a side view of the bottom reservoir (drinking cup) of the drink holder of FIG. 1.
Figure 6:
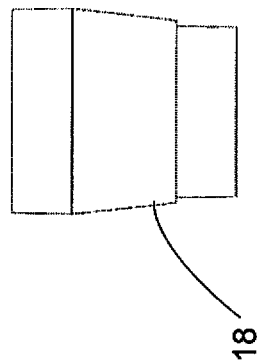
FIG. 6 is a side view of the insulating sleeve of the cooling system of the drink holder of FIG. 1.
Figure 12:
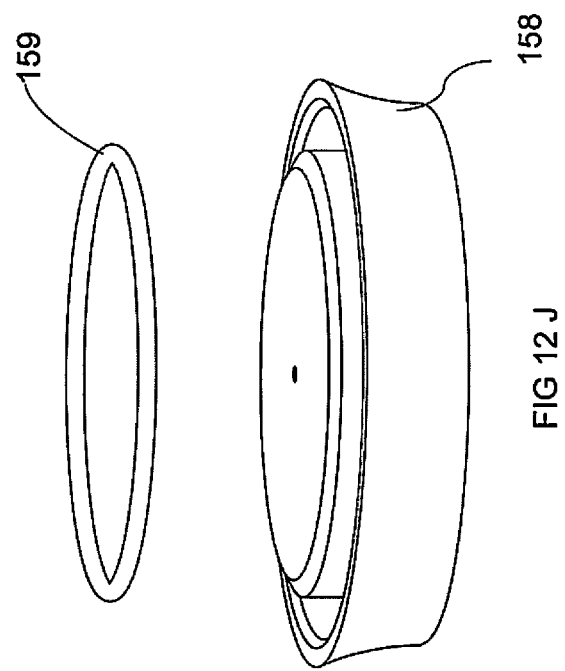
Figure 12:
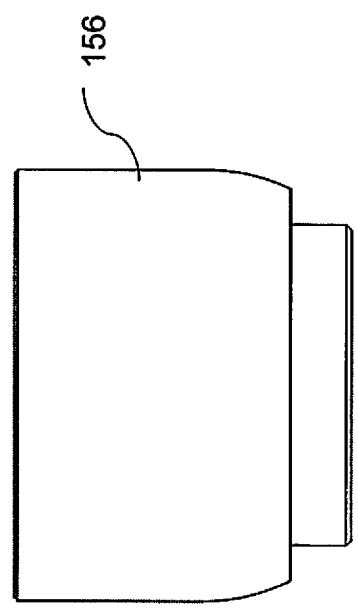
Figure 13:
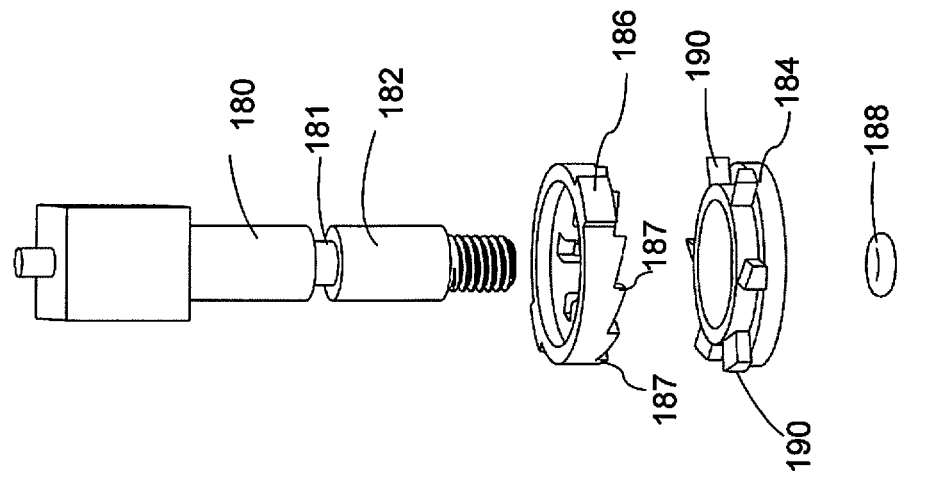
Figure 13:
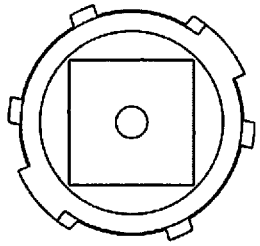
Figure 13:
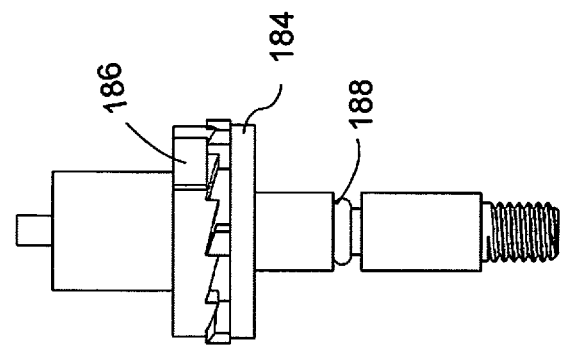
Figure 13:
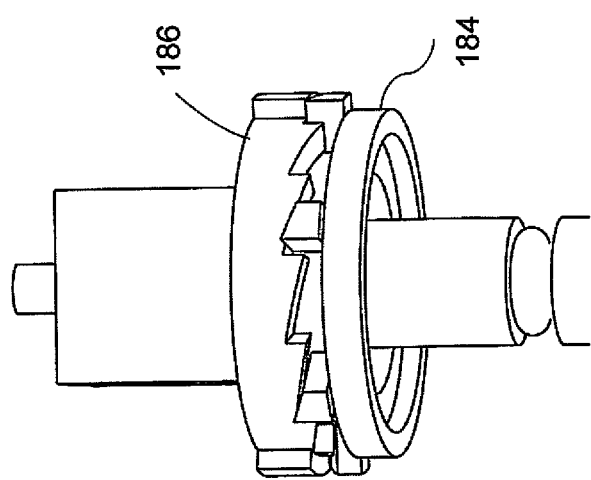

In FIGS. 1 and 2, the shaker (holder) is shown with the components assembled such that the top reservoir 12 is mounted to and sits atop the cooling system 14 and the bottom reservoir 18 sits underneath and is mounted to the bottom of the cooling system 14. Thus, the terms "top" and "bottom" as used herein refer to the orientation of the holder in FIGS. 1 and 2. In this orientation, the top can also be referred to as the proximal end (where the liquid is initially contained) and the bottom can also be referred to as the distal end (where the liquid flows into from the cooling system 14). The "top" and "proximal" thus denote the position of the liquid prior to cooling and the "bottom" and "distal" denote the position of the liquid after cooling. Clearly, if the orientation of the drink holder 10 changes, the top and bottom would change accordingly.

Turning now in more detail to the individual components of the drink holder 10, and turning first to the top reservoir 12, the top reservoir 12 includes a top surface 22, a receptacle 24 to hold the liquid, an outer surface or wall 28 and a bottom surface 30. The bottom surface 30 has openings to communicate with the cooling system as described in detail below. The top reservoir 12 is removably mounted over the cooling system 14 and can be mounted to the insulating sleeve 18 as shown, or alternatively, mounted to the cooling cartridge 16, e.g., connected to the lip of the cartridge 16. In one embodiment, the top reservoir 12 snaps onto the cooling system 14 for securement thereto. In an alternative embodiment, the top reservoir 12 and cooling system 14 are attached by a twist lock, e.g., the top reservoir is placed over the lip of the cooling cartridge 16 and locked by a ¼ turn. Other ways to removably secure the top reservoir to the cooling system are also contemplated. The top reservoir 12 can include a series of spaced ribs 27 on its outer wall 28 to provide a gripping surface to facilitate handling, e.g., tightening and loosening of the top reservoir 12 on the cooling system 14. It is also contemplated that other types of projecting surfaces or irregular surfaces can be provided to facilitate gripping of the top reservoir 12 by the user. Contained (stored) within the top reservoir 12 is the cocktail (or other drink). The components of the cocktail flow through the cooling system 14 to be chilled as described in detail below. Note the liquid in the first reservoir 12 can be for example a single alcoholic beverage or a multiple alcoholic beverages. Thus, the term liquid used herein denotes one or more drinks or beverages which are contained within the first reservoir 12. It should also be noted in preferred embodiments the liquid is an alcoholic beverage, however, it is also contemplated that non-alcoholic liquids or beverages can be used.

The top reservoir 12 also includes a seal to retain the liquid in the receptacle. That is, the top reservoir is sealed to allow the liquid ingredients to remain in place until ready to be allowed to flow through the middle cooling mechanism and drink the cocktail. In the embodiment of FIG. 1, the seal includes a disk which spans the opening in the receptacle 24. The disk has a plurality of openings which in a sealed position are out of alignment with the tubes (described below) of the cooling cartridge 16. To open the seal, the disk is rotated so the openings align with the openings in the tubes. Stated another way, the top reservoir 12 is separated from the middle cooling mechanism by a seal. The seal ensures the liquid ingredients remain in place within the top reservoir 12 until ready to be allowed to flow through the middle cooling mechanism for drinking of the cocktail. The seal is released when the top reservoir 12 is turned to allow alignment of the openings and the liquid to flow through the cooling mechanism. It should be appreciated that the foregoing provides one example of a seal, as other seals can be utilized.

FIG. 11A shows an example where two openings for liquid flow are provided when the seal is open. More specifically, in this embodiment, top reservoir, designated generally by reference numeral 112, has a cup 113, an upper disk 114 with a post 116, a rotatable disk 118, an O-ring seal 120 mounted on disk 118, a threaded ring 122 and a twist cap 124. In a first position, openings 119 of rotatable disk are out of alignment with openings 117 of upper disk 114. (The openings 121 of O-ring 120 are aligned with the openings of the disk 118). To open the seal so liquid can flow from the cup 113 into the cooling reservoir, the disk 118 is rotated by turning twist cap 124 so openings 119 of rotatable disk 118 are in alignment with openings 117 of upper disk 114. It should be appreciated that in this embodiment, the lower disk 118 is rotated to align the holes, but in an alternative embodiment, the upper disk 114 could be rotated to align the holes with the lower disk 118 to move the seal from the closed to the open position to allow flow.

Turning now to the bottom reservoir 20 of drink holder 10, also referred to herein as a drinking cup or cocktail glass, and when used with alcohol, as a cocktail glass, as noted above, the bottom reservoir 20 is mounted to a bottom portion of the cooling system 14. The bottom reservoir 20 has a receptacle 40 with an opening 41. A base 44 enables the bottom reservoir 20 to stand on a table or other surface, either as a separate unit or when assembled to the drink holder 12 to support the drink holder 10 in an upright position. The bottom reservoir 20 is removably mounted over a bottom region (portion) of the cooling system 14 and can be mounted to the insulating sleeve 18 as shown, or alternatively mounted to the cooling cartridge 16. In one embodiment, the bottom reservoir 20 snaps onto the cooling system 14 for securement thereto. In an alternative embodiment, the bottom reservoir 20 and cooling system 14 are attached by a twist lock, e.g., the bottom reservoir 20 is placed over the lip of the cooling cartridge 16 and locked by a ¼ turn. Other ways to removably secure the bottom reservoir 20 to the cooling system are also contemplated. The bottom reservoir 20 can include ribs 48 on its outer surface (wall) 45 to provide a gripping surface to facilitate handling, e.g., tightening and loosening of the bottom reservoir 18 on the cooling system 14. It is also contemplated that other types of projecting surfaces or irregular surfaces can be provided to facilitate gripping of the bottom reservoir 20 by the user. If desired, one or more ingredients such as a garnish for the cocktail (or other drink), e.g., a cherry, can be contained (stored) within the bottom reservoir 20. The components of the cocktail flow from the top reservoir 12 through the cooling system 14 where they are chilled and delivered to the bottom reservoir 20 to provide a cooled cocktail for drinking. The bottom receptacle forms a cup that serves as the cocktail glass. The desired garnish may be placed in the bottom receptacle in preparation of the cocktail being decanted into the glass.

It should be appreciated that the shaker is described herein for providing alcoholic drinks/cocktails. However, the shaker can also be utilized to provide non-alcoholic chilled drinks/cocktails.

Turning now to the cooling system 14 at the middle section of the drink holder 12, as noted above, the cooling system 14 includes a cooling cartridge 16 and an insulating sleeve 18 surrounding at least a portion of the cooling cartridge 16 to insulate the cooling medium to reduce its temperature rise when the cooling cartridge 16 is removed from the freezer for use. The cooling system 14 enables the liquid from the top reservoir 12 to be chilled as it flows through the system. This cooling system (mechanism) 14, e.g., the cooling cartridge 16, is stored or placed in the freezer until ready to be used.

The cooling medium for chilling, i.e., lowering the temperature of the liquid as it passes therethrough, can in some embodiments be a water-based cellulose gum refrigerant such as P600 Gel Concentrate sold by Cold Ice, Inc. or VWR Product sold by Cold Chain Technologies, Inc. As can be appreciated, other cooling mediums are also contemplated. In some embodiments, the cooling medium can be chilled to less than 0 degrees Fahrenheit to allow for the liquid, e.g., cocktail, to be chilled to a desirable temperature of approximately 32 degrees Fahrenheit after passing (draining) through the chilling mechanism once. Additionally, other temperatures are also contemplated.

The insulating sleeve 18 in some embodiments has a double wall construction with an outer surface or wall 53 and an inner surface or wall 52 spaced from the inner wall to create a gap therebetween which can include a vacuum insulation. Note constructions other than the double wall construction are also contemplated. The insulating sleeve 18 has a receptacle 54 to receive the cooling cartridge 16 so it surrounds at least a portion, and preferably a substantial portion, or an entire portion, of the outer wall 17 of the cooling cartridge 16. In this manner, the cooling cartridge 16 sits within the receptacle 54 with the insulating sleeve 18 reducing the temperature rise of the cooling cartridge 16 after removal from the freezer. The insulating sleeve 18 can have internal guides or spacers, such as in the form of the longitudinally extending ribs 56 of FIG. 3 to help guide the cartridge 16 into the insulating sleeve 18. The insulating sleeve 18 could in some embodiments have a taper, tapering in a distal direction, i.e., tapering toward the bottom portion, to help retain the cooling cartridge 16 therein. In some embodiments, placement of the bottom reservoir 20 over the insulating sleeve 18 can also help hold the sleeve 18 onto the cooling cartridge 16 as the bottom reservoir 20 is inserted over the bottom portion of the insulating sleeve 18.

Figure 19:
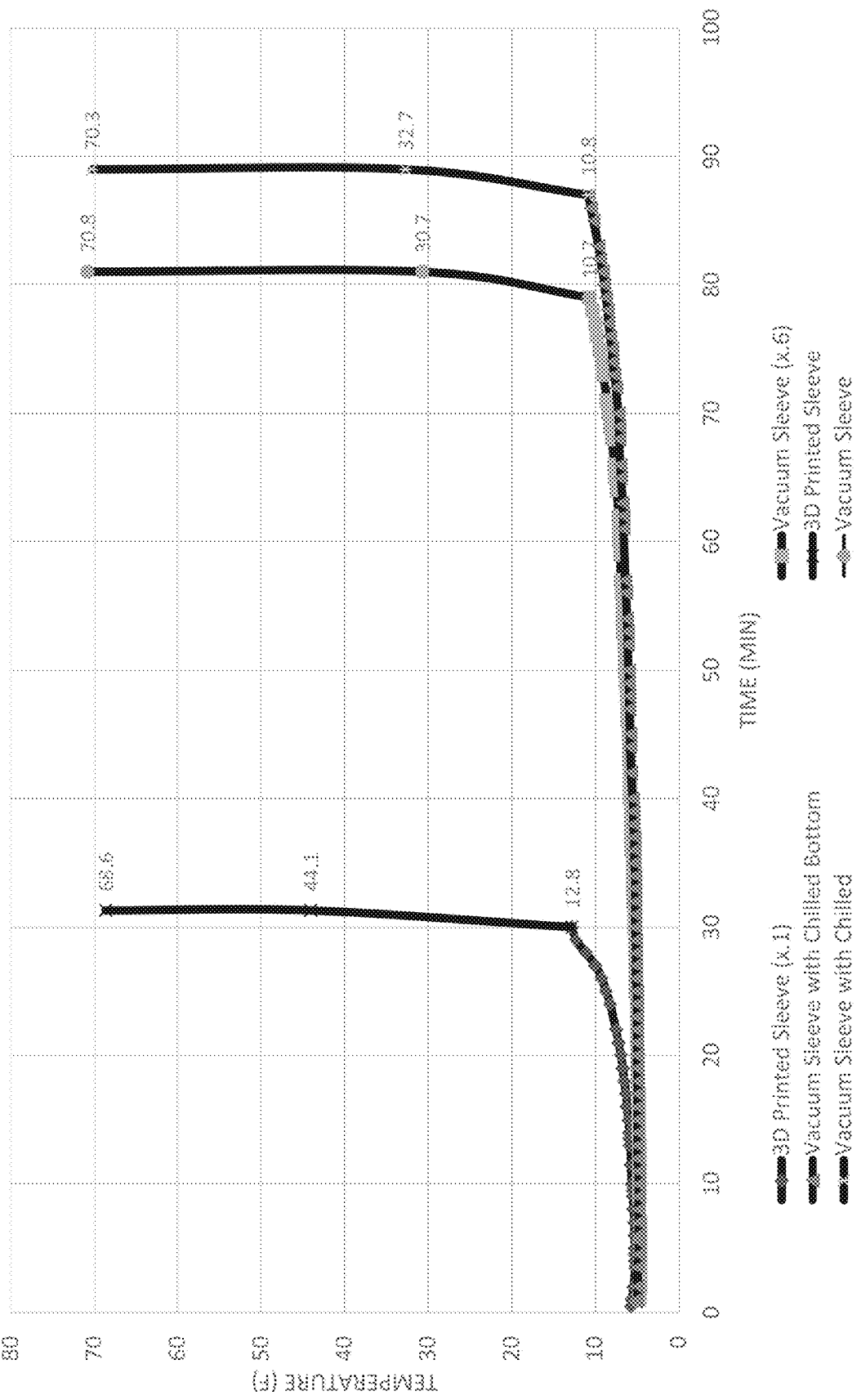
FIG. 19 is a chart showing temperature change with an insulating vacuum sleeve.

The advantage of the insulating vacuum sleeve can be appreciated by the chart of FIG. 19 which provides a sample test of the vacuum sleeve. In the absence of the vacuum sleeve, the temperature of the cooling cartridge (y axis) rises from its initial 5 degrees to 44.1 degrees in a little over thirty minutes (x axis). The 44.1 degree temperature is insufficient to provide the desired chilled drink. As further shown, after 30 minutes the temperature continues to spike to 68.6 degrees (close to room temperature). In contrast, with the use of the vacuum sleeve insulator, the temperature of the cooling cartridge, with an initial start temperature of 5 degrees, will take close to 90 minutes to rise to 32.7 degrees, and spike to 70.3 degrees rise. That is, only after 90 minutes will the temperature rise significantly to lose the chilled effect on the drink. Thus, as shown in this test, the cooling cartridge with the insulating sleeve can last three times longer than without the sleeve.

In an alternate embodiment, the bottom reservoir 20 has an insulator to help maintain a cooler temperature. The insulator can be integral with the reservoir or mounted to the reservoir. FIGS. 12G-12J illustrate an example of such embodiment and are discussed in detail below.

Turning now to the cooling cartridge 16 of the embodiment of FIG. 1, as shown in FIGS. 8-9E, cooling cartridge 16 has top cap or cover 60, a receptacle 80 to receive a plurality of internal longitudinally extending tubes 84, and a bottom cap or cover 70. The receptacle 80 has a top opening 82 and a bottom opening 85. A cooling medium, such as a gel discussed above, fills the receptacle 80, surrounding the individual tubes 84. The tubes 84 extend longitudinally along a length of the receptacle 80 and in the illustrated embodiment, are independent and not in fluid communication with one another, although in alternate embodiments, one or more of the tubes can be in fluid communication. Thus, the tubes provide elongated members to provide passageways through the cooling gel (or other cooling medium). The tubes are preferably spaced apart a sufficient distance so as not to impact an adjacent tube which could cause undesired temperature rise. That is, if the tubes 84 are too close, they can heat up around the tubes, thereby decreasing cooling efficiency. Stated another away, the more cooling gel between the tubes, the greater the chance of maintaining cooling effectiveness.

Each of the tubes 84 has a proximal or top opening 87 for fluid communication with the top reservoir 12 and a distal or proximal opening 88 for fluid communication with the bottom reservoir 20. In this manner the liquid flows through the tubes 84 into the bottom reservoir 20. To facilitate such flow, the top cap 60, which in some embodiments can be disc shaped as shown to span the diameter of the receptacle 80, can have a plurality of funnels 62, illustratively conically shaped, and tapering (funneling) toward the top openings of the tube 87. This facilitates flow into the tubes 84. The funnels 62 are secured to the tubes 84. The bottom cover 70, which in some embodiments is disc shaped to span the diameter of the receptacle 80 can be arranged parallel to the longitudinal axis of the receptacle 80 as shown, can have a plurality of posts 72 attached to the bottom of the tubes 84. These tubes, forming multiple narrow channels surrounded by the cooling mechanism allow for efficient cooling as they maximize the surface area for chilling with a single pass through the cooling cartridge 16.

In an alternate embodiment, the bottom cover 70 can include a plurality of funnels, conically shaped and tapering proximally toward the proximal openings 88 in the tubes 84. These funnels can facilitate passage back through the tubes 84 to further cool the liquid as described in alternate embodiments discussed below.

The number of tubes 84 selected for the cooling cartridge is dependent on the amount of liquid desired to be stored in the drink holder 10, the desired end temperature of the liquid in bottom reservoir 20 for drinking, and the amount of time desired for passing the liquid from the first reservoir 12 into the second reservoir 20. Thus, these parameters, and a balance of these parameters to provide the optimized holder, must also be achieved in an easily transportable apparatus with drinking cups of usable size and shape. For example, if the tubes have too large a diameter, than the liquid will flow too rapidly through the cooling system and provide insufficient time to cool to the desired temperature. On the other hand, if the tubes are too small in diameter, then the passage of liquid through the cooling system could take too long and be unsatisfactory to the user who does not want to wait a long time for the drink to be chilled. The height of the tube also affects time of passage through the cooling system. Therefore, a balance must be achieved so that there are sufficient number of tubes of small enough size and long enough length to enable slow enough passage of the liquid through the tubes so the liquid is chilled to the desired temperature, e.g., about 32 degrees F., but of sufficient size and length so that it does not take an inordinate amount of time for passage therethrough. This must also be balanced with the amount of liquid desired to be passed from the first reservoir into the second reservoir. The height of the liquid in the first reservoir can also affect flow. The foregoing parameters are also applicable to the coils discussed in detail below.

Figure 17:
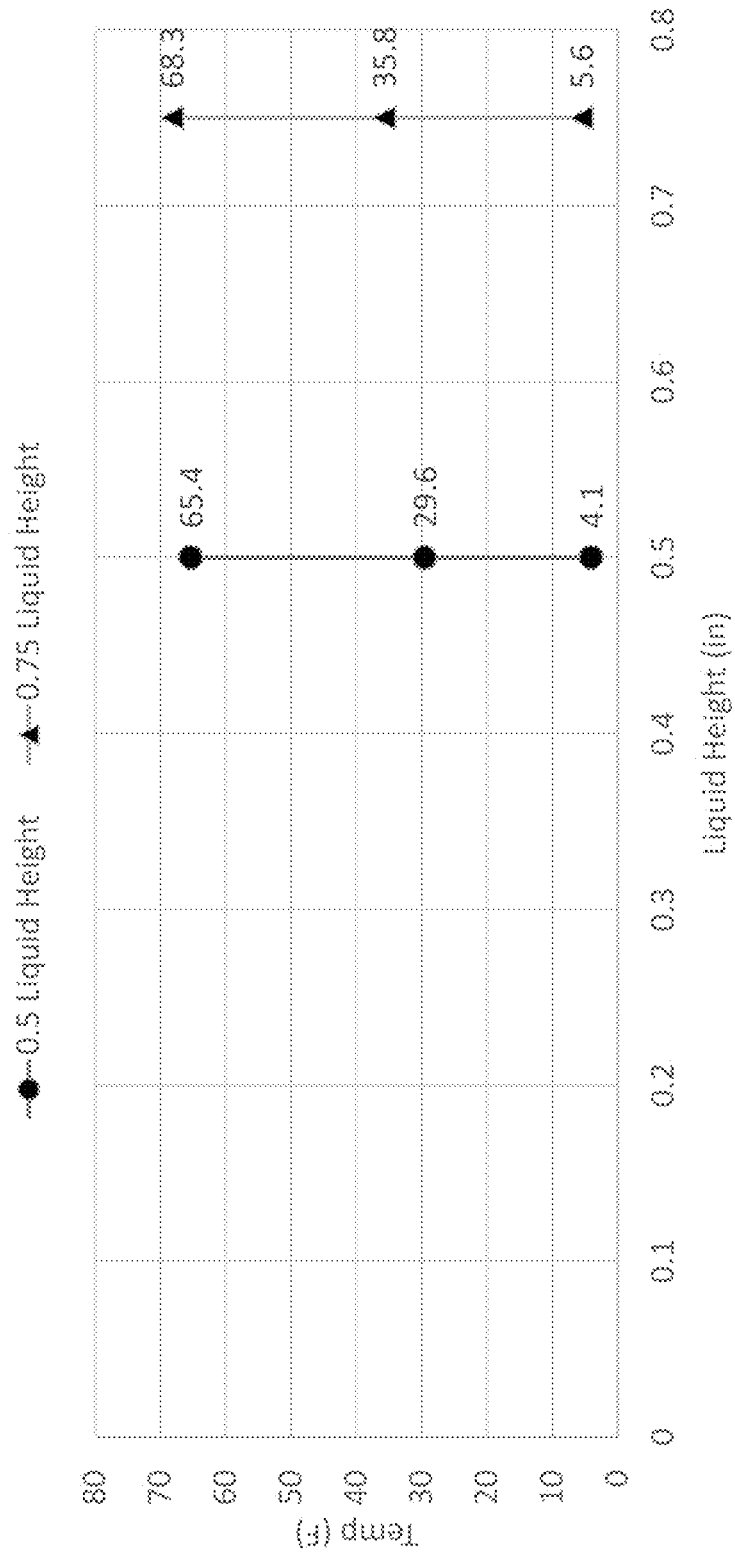
FIG. 17 is a chart comparing liquid height and temperature.
Figure 18:
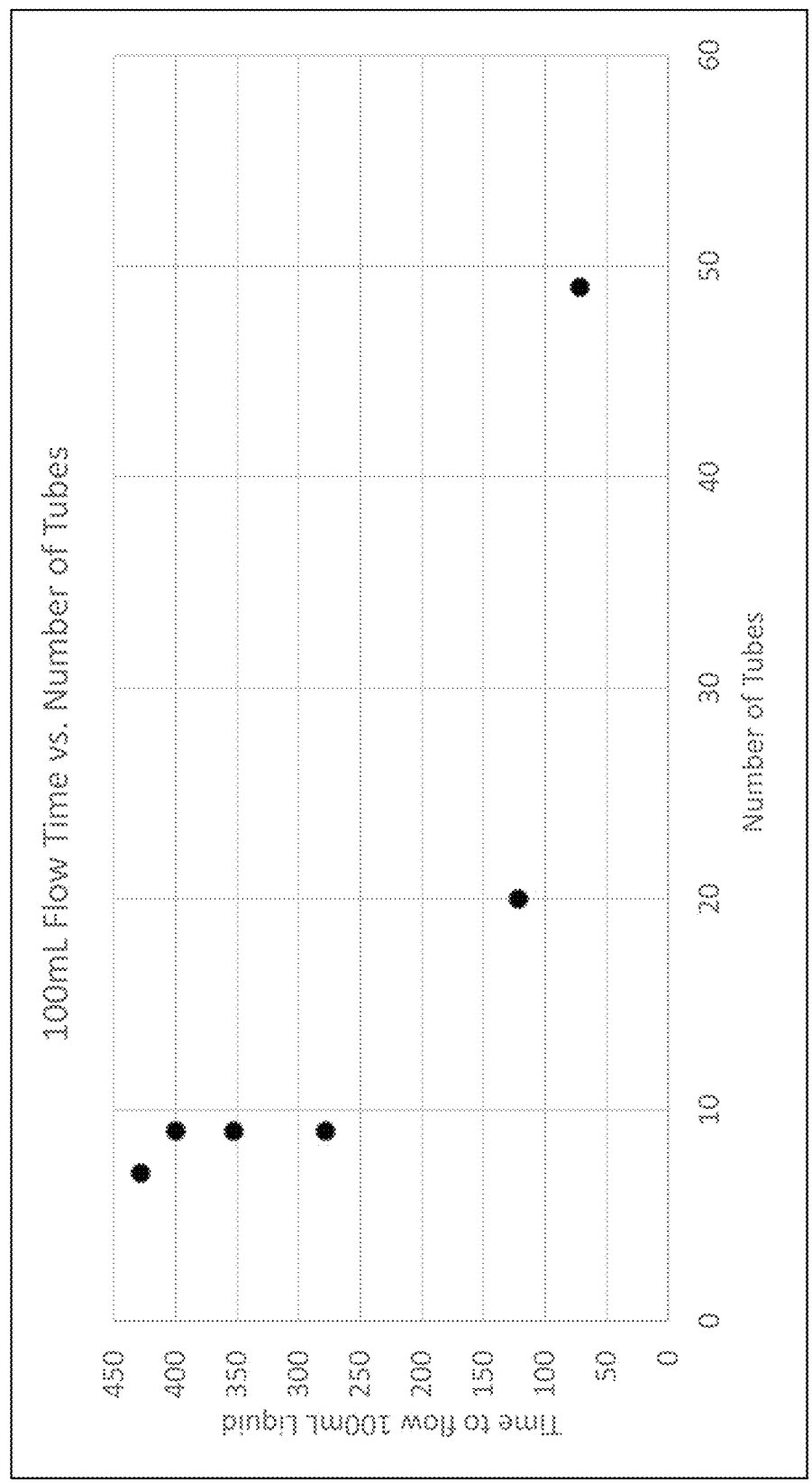
FIG. 18 is a chart comparing the number of tubes and time to flow.

The charts of FIGS. 15-18 explain how the number and size of tubes was optimized. In FIG. 15, a tube of 035 inches internal diameter was compared to a tube of 0.042 inches. In FIG. 16, three different tube lengths were tested and as the results show, a two inch length (when the height of the liquid in the first reservoir is 0.5 inches) was too short so that insufficient cooling occurred. Temperature rise was more acceptable with tubes lengths of 2.5 and 3 inches. Thus, desirably, the tube length is about 2.5 inches or greater. FIG. 17 shows how the height of the liquid affects flow, utilizing a tube of 3 inch lengths and 0.035 inch internal diameter. The liquid needs to be of sufficient height to create pressure for passage within a reservoir that fits with the holder. That is, if of insufficient height, the liquid won't flow. In preferred embodiments, the height is greater than 0.5 inches. Thus, in the illustrated embodiment, for passage of 3-5 ounces of liquid, 36 tubes are utilized, each having a length of about 2.5 inches and an internal diameter of about 0.035 inches. FIG. 18 illustrates how the increase in the number of tubes increases the liquid flow time, using 100 ml of liquid as an example.

It should be appreciated that other dimensions/parameters are also contemplated and the present invention is not limited to the foregoing or limited to the parameters in the charts of FIGS. 15-18.

In some embodiments, the drink holder (shaker) of the present invention can provide for additional cooling of the drink. That is, the liquid is transportable (flowable) from the first reservoir 12 through the cooling cartridge 14 into the second reservoir 20 so the initial temperature of the liquid is lowered to a second temperature by the cooling cartridge 14 for passage into the second reservoir. If further cooling is desired, the liquid can be transportable (flowable) from the second reservoir 20 back through the cooling cartridge 14 and into the first reservoir 12 to further lower the temperature of the liquid. Thus, the liquid is capable of being passed back and forth from one of the first and second reservoirs 12, 20 to the other of the first and second reservoirs 12, 20 via passage through the plurality of tubes within the cooling cartridge 14, wherein each passage of the fluid through the plurality of tubes lowers the temperature of the liquid so the temperature of the liquid can be controlled to a desired temperature for drinking. In such embodiments, the first reservoir 12 as well as the second reservoir 30 can be in the form of drinking cup so the user can remove the desired reservoir and drink the liquid when it is cooled to the drinker's desired temperature. Note that liquid can be transported between the reservoirs by turning the drink holder 10 upside down to enable the liquid to flow in the reverse direction through the tubes.

In the alternate embodiments of FIGS. 28A-30C, the passageways through the gel are provided by one or more elongated members in the form of coils having passageways therethrough for transport of liquid. The number of coils shown are provided as an example as a different number of coils can be provided. In the embodiment of FIGS. 28A-28C a plurality of longitudinally extending parallel coils 262 are provided within cooling cartridge 260 extending from the top region 267 to the bottom region 265. The coils have a series of loops 263 with diameters defined by gap 264 in the loops 263. The loops 263 slow down the fluid flow to provide for cooling as the fluid flows through the internal diameter of the spiral coil for passage the top reservoir to the bottom reservoir (and in some embodiments, from the bottom reservoir back to the top reservoir for additional cooling as discussed above).

In the embodiment of FIGS. 29A-29C a plurality of longitudinally extending parallel nested coils 272, 273 are provided within cooling cartridge 270 extending from the top region 277 to the bottom region 275. The coils 273 have a series of loops 279 and the coils 272 have a series of loops 278 with gaps 274 through the loops 278, 279 to define a width. The fluid flows through the inner diameter for passage from the top reservoir to the bottom reservoir (and in some embodiments, from the bottom reservoir back to the top reservoir for additional cooling as discussed above). The coils 272, 273 and their loops 278, 279 are preferably spaced apart slightly as shown. The nested coils 272, 273 provide increased surface area for increased cooling of the fluid flowing through the coils 272, 273.

The coils of FIGS. 28A-29C are parallel or substantially parallel and positioned adjacent one another. In the embodiment of FIGS. 30A-30C, the coils are concentric. More specifically, coil 282 forms an inner coil, coil 284 forms an intermediate coil and coil 286 forms an outer coil within cooling cartridge 280. As shown, the diameter (width) of the coils of the inner coil 282 is less than the diameter (width) of the coils of the middle coil and the diameter (width) of the middle coil is less than the diameter (width) of the outer coil. Note a greater or fewer number of concentric coils could be provided. The opening 283 in inner coil 282, opening 285 in middle coil 284 and opening 287 in outer coil 286 are of different sizes, defining different widths of the coil which affect fluid flow and therefore cooling.

In addition to the different number of coils that could be provided, the coils can have different pitches, different diameters (widths) and different inner diameters. These parameters drive the number of coils that are preferably for performing the cooling function during passage through the cooling cartridge since, as described above, the balance must be made between sufficient time of passage for cooling without taking too much time to prepare the drink. For example, as the pitch increases, the faster the fluid flows through the cartridge. As the width (diameter) of the coil itself (defined by the size of the loops) increases, the slower the fluid flow through the cartridge (as it winds through the coil). The more coils, the faster the flow because more passageways (channels) are provided. The larger the inner diameter of the coil itself (defined between the inner and outer wall), the faster the flow. The coils generally have greater surface area than the tubes so there is a larger surface contact area with the cooling gel so that comparatively a fewer number of coils could achieve the same cooling affect as compared to the tubes. However, this could depend on the parameters of the coils and the tubes. The coils can be made of various materials such as metal or plastic.

It should be appreciated that the various embodiments of the shakers described herein can utilize either the tubes or the coils to provide passageways or channels through the cooling medium within the cartridge.

The portable cocktail shakers of the present invention, as noted above, can be in a reusable or in a disposable form. In the reusable form, in some embodiments, it is well crafted, stainless steel construct that resembles the traditional cocktail shaker in size and shape. It is modular as the top reservoir (receptacle) 12, middle cooling section which contains the cooling system 14, and bottom reservoir (receptacle or cup) 20 can be screwed together and taken apart for repetitive use. The middle section, which forms the cooling system, remains in the freezer until ready to be used. The ingredients of the cocktail are then placed in the top reservoir 12 and screwed, or otherwise mounted, to the top portion of the middle cooling section 14. The desired garnish will be placed in the bottom receptacle 20 and screwed or otherwise mounted, to the other end, i.e., the bottom portion of middle portion 14. This will allow for the portable cocktail shaker 10 to travel and to be transported to the desired destination and allow for enjoying a well-crafted, chilled cocktail up to several hours later when ready. Many American cities have a BYOB culture and the portable cocktail shaker allows for a BYOC—bring your own cocktail. The cocktail may be mixed at home, placed in the top reservoir 12 of the portable shaker 10 and enjoyed at a later time by chilling the cocktail by passing it though the cooling system 14. This may be at a restaurant or other social event. When ready to be enjoyed, the top reservoir 14 is simply turned to allow alignment of openings and the shaker 10 can be placed on the table to allow the cocktail to flow through the cooling mechanism 14 into the bottom receptacle 20. The bottom receptacle 20 is then screwed off the middle section and the chilled cocktail is enjoyed with friends as the receptacle forms a drinking cocktail glass.

FIGS. 10A-10C and 12A-13R illustrate an alternate embodiment of the drink holder (portable shaker) of the present invention, designated by reference numeral 130. As shown, in this embodiment, the cooling cartridge assembly has a cooling cartridge 131 (FIGS. 12A-12C), a bottom plate 134 on which the cooling cartridge 131 is mounted as it fits within the circular recess 136, a plurality of longitudinally extending tubes 139 (as in tubes 84 described above) which can be arranged parallel or substantially parallel to the longitudinal axis of the drink holder 130, and two O-ring seals 138, 140 positioned in upper and lower circular recesses of top plate 142 which prevent fluid from seeping down in a space external of the cooling tubes 139. One or more O-ring seals as well as other types of seals could be provided to prevent fluid seepage. The tubes 139 (as well as tubes 84 described above) can have a lining or coating in the internal diameter to prevent freezing of the media. That is, condensation could form in the tubes and the coating inside could provide a slippery surface so the water doesn't adhere to the tubes. Plug 145 in top plate 142 holds the cooling gel inside the cartridge. The cooling cartridge 131 is seated within the insulating sleeve 144. Insulating sleeve 144, as shown in FIGS. 12D-12F, has reduced diameter top and bottom portions, with bottom portion having a smaller diameter than the top portion. Insulating sleeve 144 has an upper and lower circular recess 146, 148 to receive respective upper and lower sealing O-rings 150, 152. The insulating sleeve 144 can be a single wall or a double wall design as described above.

The bottom reservoir 156 shown in FIGS. 12G-12I functions like the bottom reservoir 20 of FIG. 3, but differs in the configuration, having a wider shape, and is mounted to the bottom of the insulating sleeve 144/cooling cartridge 131 as in the embodiments discussed above. Bottom reservoir 157 also differs from FIG. 3 in that it is composed of two components—cup 156 shown in FIGS. 12G, 12H and 12I and cooling plug 158 shown in FIGS. 12J and 12K. Cooling plug 158 includes an O-ring seal 159 and a cooling gel and is configured to be mounted over the bottom region 155 of the open cup 156 to close the cup. The cooling plug 158 helps to keep the drink within the bottom reservoir cool. Note in some embodiments, the cooling plug 158 can be mounted to the bottom of the cooling cartridge 131 or insulating sleeve 144 and then removed from the cartridge 131 or sleeve 144 and mounted to the bottom cup 156 prior to pouring the drink from the top reservoir through the cooling cartridge and into the bottom reservoir. This is shown for example in FIGS. 10D-10F wherein the cooling plug 158 is mounted directly to the insulating sleeve 144 and can then be removed for mounting of the cup. In some embodiments, the insulating sleeve and the bottom cup can each have a cooling plug (with cooling gel) so the plug does not have to be removed for mounting to the bottom cup.

In this embodiment, a push button assembly is provided to open the seal to allow fluid/drink flow from the top reservoir 170 into the cooling cartridge 131. With the push button assembly, the user presses the button inwardly (downwardly/distally) to open the seal to allow fluid flow. It is held in this lower position by structure in the top reservoir (described below) until it is depressed again wherein it springs back to its original (initial) position wherein the seal is closed.

More specifically, the push button seal assembly 160 is mounted within the top reservoir 170 and is illustrated in FIGS. 13A-13C. The push button assembly 160 is contained with the top reservoir (top cap) 170 and includes a locking tube 162, pressable push button 164, spring 166, mounting disk 167 and sealing disk 168 with a gasket 169. Spring 166 biases push button 164 in the upper (proximal direction). The sealing disk 168 is movable between a first position wherein fluid is blocked from flowing into the cooling cartridge (FIG. 13K) and a second position wherein fluid is allowed to flow into the cooling cartridge (FIG. 13L), and is moved by actuation of the push button assembly 160.

The push button assembly 160 includes push button support 180 with shaft 182 onto which rotation disk 184 and driving disk 186 are mounted, the driving disk 186 mounted atop the rotation disk 184. Rotation disk 184 has a plurality of circumferentially spaced radially extending tabs 190 for indexing as it is rotated as described in detail below. Driving disk 186 has a series of wavy cam surfaces 187 engageable with the tabs 190 of rotation disk 184 to cause rotation. The disks 186 and 184 are mounted within the locking tube 162 and the tabs 190 are engageable with an inner surface of the locking tube 162. A button support 188 is mounted within recess 181 of post 182.

The interaction of the disks 184, 186 and locking tube 162 will now be described with reference to FIGS. 13N-13R. In the initial position, wherein the top reservoir is sealed so liquid is prevented for flowing out, tabs 190 of rotation disk 184 are blocked from downward movement by internal splines 162a extending radially inwardly from the inner wall of locking tube 162. In this position, driving disk 186 and rotation disk 184 are at an upper or proximal position (as in FIG. 13K). When it is desired to unseal the drink holder, the push button 164 is pressed distally (inwardly/downwardly), moving attached driving disk 186 distally which causes camming surfaces 187 to rotate the rotation disk 184 in a first direction as camming surfaces engage and cam tabs 190 of rotation disk 184. Rotation of disk 184 moves the locking tabs 190 out or engagement with the internal splines 162a and into alignment with the gaps between the internal splines 162a which are radially spaced around the internal wall of the locking tube 162. Thus, the tabs 190 move out of blocked engagement with the splines 162a and into an unblocked position between the splines 162a. This enables the rotation disk to be moved distally within the locking tube 162 (carried by the push button support/shaft 182) so the sealing disk 168 can move from its sealing (blocking) position of FIG. 13K to its non-sealing (unblocking) position of FIG. 13L so fluid can flow in the space around the disk as depicted by the arrows in FIG. 13L.

FIG. 13R show these phases of movement wherein 1) the rotation disk 184 is initially blocked from moving in the recess 163a between the splines 162a; 2) the push button 164 is pressed to cause rotation of the disk 184 and the rotation disk 184 and driving disk 186 are moved distally (by push button support 180) until stopped by engagement of the driving disk 186 3) proximal movement of the rotation disk 184 (and driving disk 186) is blocked by engagement of the tabs 190 with the bottom edge of the outer tube 162 which therefore maintains the push/button mechanism and therefore the sealing disk 168 in the lower unsealing position; 4) the push button 164 is pressed again to move the attached driving disk 186 and rotation disk 184 distally and cause the rotation disk 184 to rotate due to the camming surfaces 187 of driving disk 186 engaging the tabs 190 to move the tabs 190 back into alignment with the recesses 163 of the inner tube 162; and 5) the push button 164 is released and returns upwardly (in a proximal direction) to its initial position carrying the disks 186, 184 and locking disk 168 to their initial position.

In an alternate embodiment, the sealing mechanism includes a vent. In the open position of the vent, the liquid is flowing down from the top reservoir; when the vent is closed, air flow is blocked. The vent can be used with any of the embodiments disclosed herein. FIGS. 21-26C illustrate one embodiment of the venting mechanism.

With initial reference to FIG. 24, the top reservoir 200 include a sealing mechanism similar to FIG. 13A having a push button assembly with a push button support 206, contained with the top reservoir (top cap) 200 and includes a locking tube 204, movable push button support 206, spring 214, mounting disk 217 and sealing disk 220. Spring 214 biases the push button in the upper (proximal direction). The sealing disk 220 is movable between a first position wherein fluid is blocked from flowing into the cooling cartridge (FIG. 21) and a second position wherein fluid is allowed to flow into the cooling cartridge (FIG. 22), and is moved by actuation of the push button.

The push button assembly includes a shaft onto which rotation disk 210 and driving disk 208 are mounted, the driving disk 208 mounted atop the rotation disk 210. The driving disk 208 and rotation disk 210 function in the same manner as driving disk 186 and rotation disk 184 of FIG. 13A, e.g., the rotation disk 210 has a plurality of circumferentially spaced radially extending tabs for indexing as it is rotated by the series of wavy cam surfaces of the driving disk engageable with the tabs, and thus the description and function of disks 184, 186 and interaction with the recesses and splines of the locking tube 162 are fully applicable to the disks 210, 208. The disks 208 and 210 are mounted within the locking tube.

Figure 23:
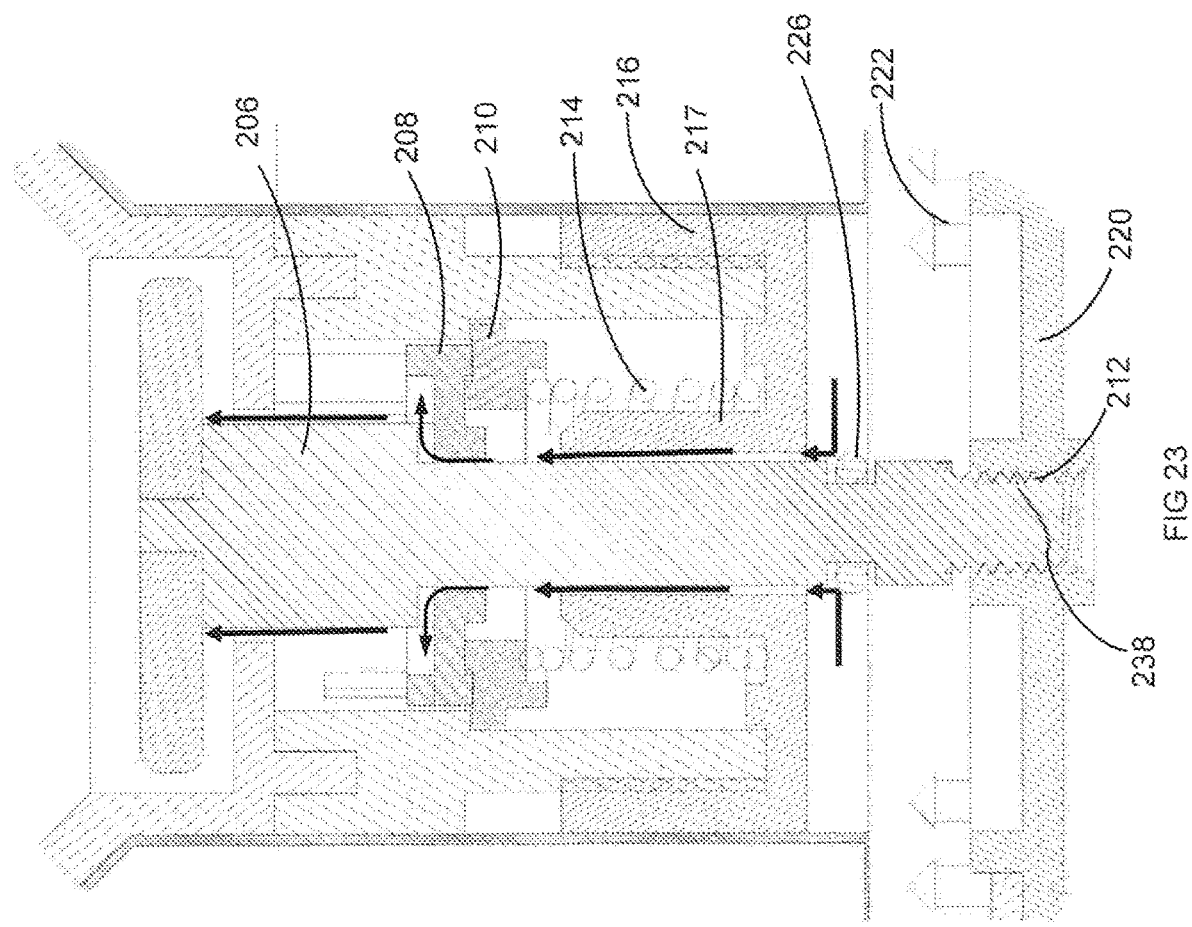
FIG. 23 is an enlarged view of the area of detail A of FIG. 22 showing venting.
Figure 21:
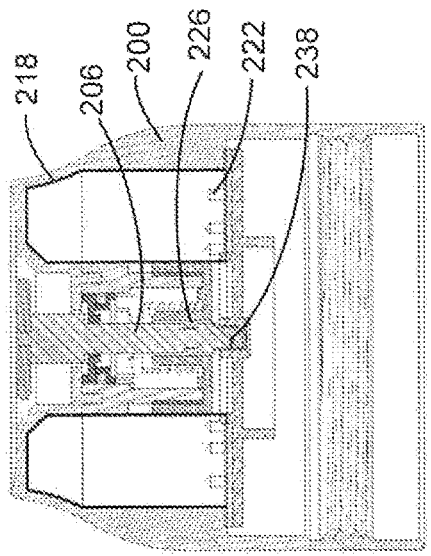
FIG. 21 is a cross-sectional view of an alternate embodiment of the sealing mechanism shown in the closed position.
Figure 22:
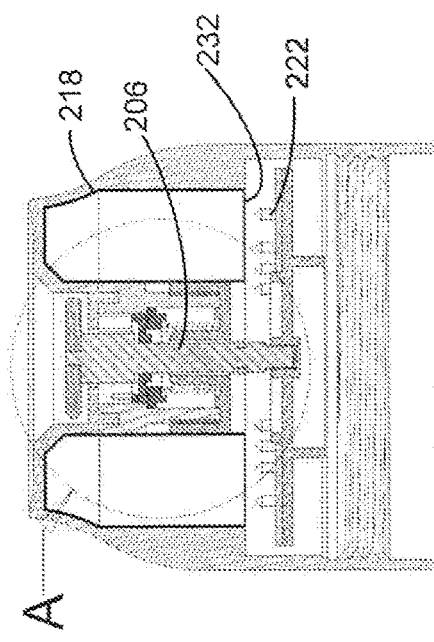
FIG. 22 is a cross-sectional view similar to FIG. 21 showing the sealing mechanism in the open position.
Figure 26:
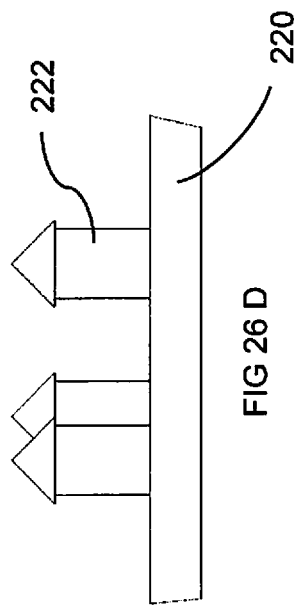
Figure 26:
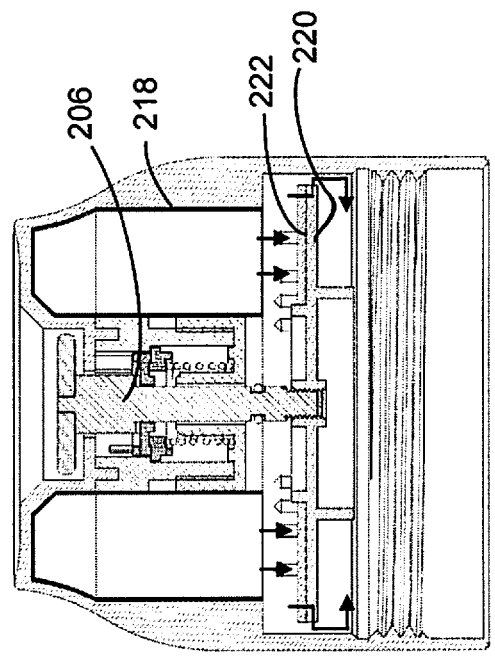
Figure 26:
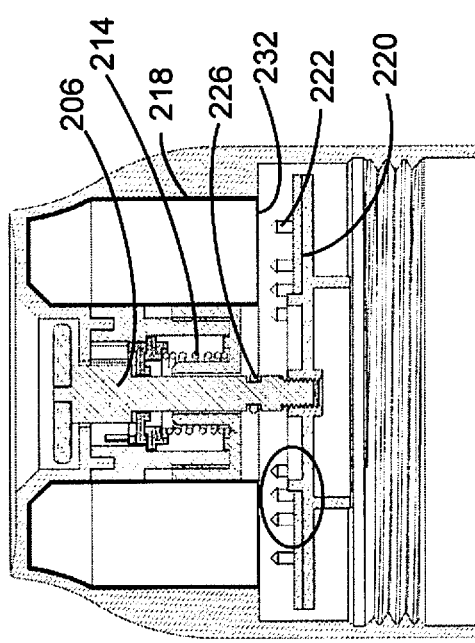
Figure 26:
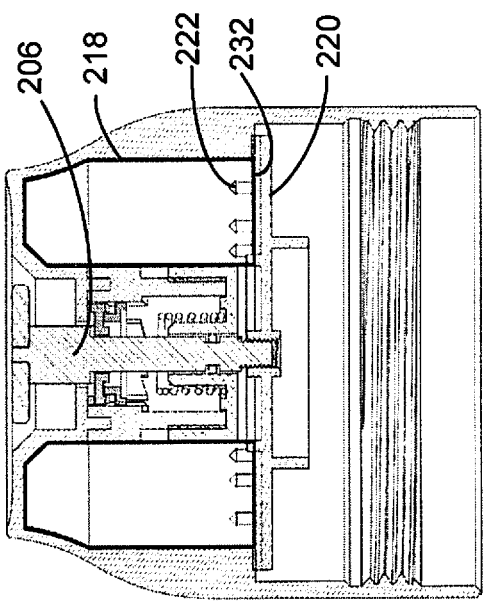

The push button assembly 206 of FIG. 24 differs from push button assembly 160 of FIG. 13A in that it includes a recess on the shaft of the push button support 206 to receive an O-ring 226. This allows for venting as shown in FIGS. 21-23. In the closed position of FIG. 21, the push button is in the proximal position wherein the vent is closed so there is no air flow. In this position, the O-ring seal 226 (which is positioned in a recces in the push button support 206 (shaft) is within the mounting disk 216, thereby closing off the opening 217. To allow passage of fluid, the push button is depressed (moved distally) to the open position of FIG. 22 to shift the O-ring 226 downwardly (distally) so the O-ring 226 moves distally of the mounting disk 216. This creates an air gap between the lower portion of the mounting disk 216 and sealing disk 220 and opens the space between the outer surface of the push button support and center post of mounting disk 216 so air can flow upwardly between the space and through the space and out through the top reservoir as depicted by the arrows of FIG. 23.

It should be appreciated that such venting can be utilized with any of the embodiments disclosed herein.

The top reservoir of FIGS. 23-26D differs from the aforedescribed reservoir in that it supports the liquid, e.g., alcohol, in a pod which has a puncturable seal to allow liquid flow. More specifically, as shown in FIGS. 25A and 25B, pod 218 has a cavity defined between outer wall 236a and inner wall 236b and is donut shaped. The liquid is contained within the cavity. The bottom layer 232 of pod 218 is in the form of a puncturable material such as a layer of foil.

The embodiment of FIGS. 23-26D also differs from the aforedescribed embodiments in that the sealing disk has a plurality of puncturable needles. More specifically, sealing disk 220 has a plurality of spaced apart needles 222 extending upwardly (proximally) configured to puncture the bottom layer 232 of pod 218. The needles can be designed so that when the bottom layer, e.g., foil, is punctured, the material is pulled down for easier flow. The shaft of push button 206 has external threads 212 threadingly engaged with internal threads 238 of the mounting disk 220. The push button 206 can be removably mounted to the mounting disk 220 in some embodiments.

In use, the pod 218 is inserted into the top reservoir 200 and the push button mechanism is in the initial position as shown in FIG. 26A. In this position, the pointed tips of the needles 22 are spaced from the bottom layer 232 of pod 218. When the user wants to pour the liquid from the top reservoir, the push button 206 is depressed and released to return to the upper position, thereby pulling the sealing disk 220 proximally (upwardly) due to the threaded connection of the push button shaft and sealing disk 220. This causes the needles 222 to penetrate the bottom layer 232 of pod 218 to create openings for passage of the fluid. The push button 206 is depressed again to return the sealing disk 220 to its initial downward (distal) position of FIG. 26C to allow liquid to flow out of the top reservoir (as depicted by the arrows) and into the cooling cartridge and then into the bottom reservoir as described in the embodiments above.

Figure 27:
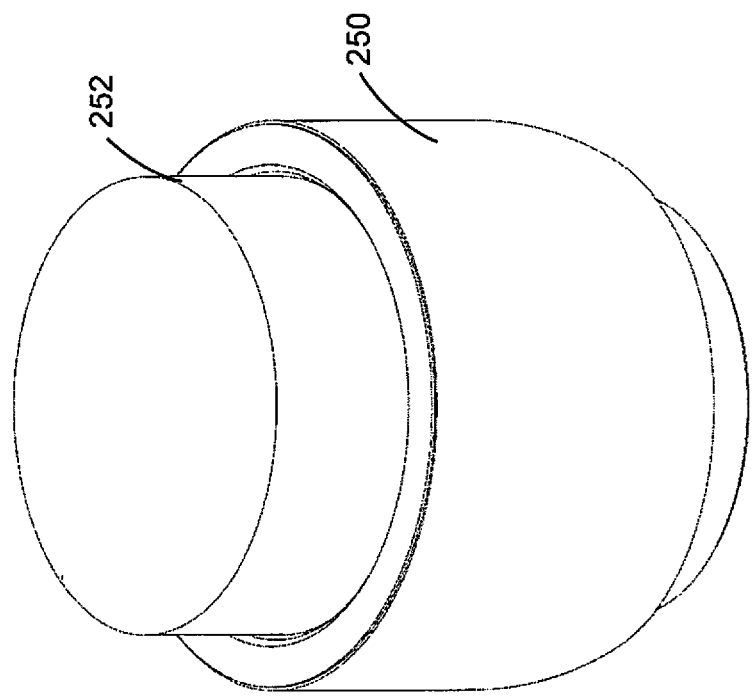
FIG. 27A is a perspective view of a pod containing garnish for the bottom reservoir.
FIG. 27B is a side view of the pod of FIG. 27A.
Figure 27:
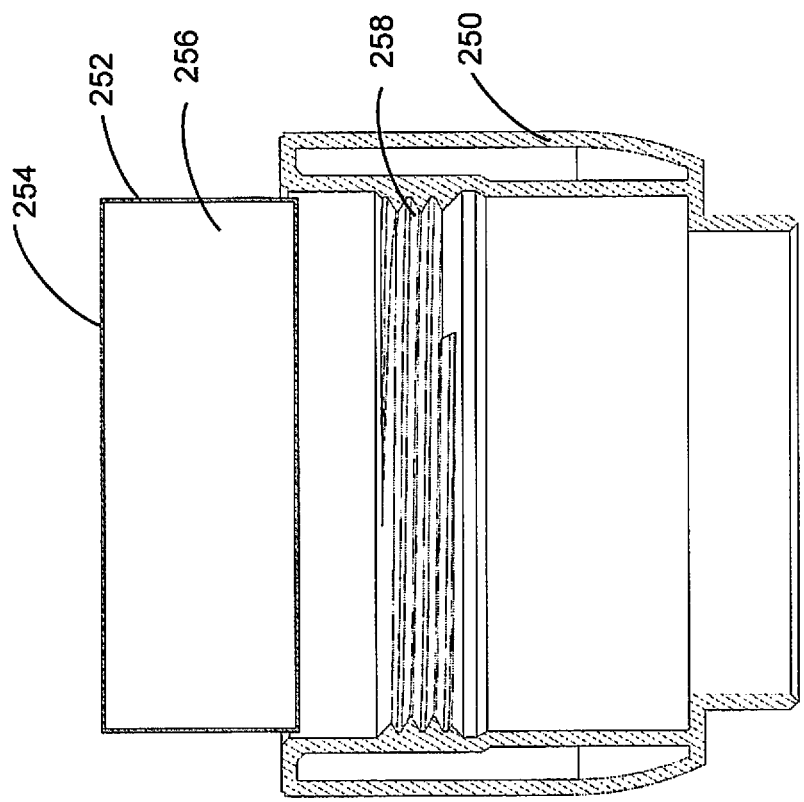
Figure 30:
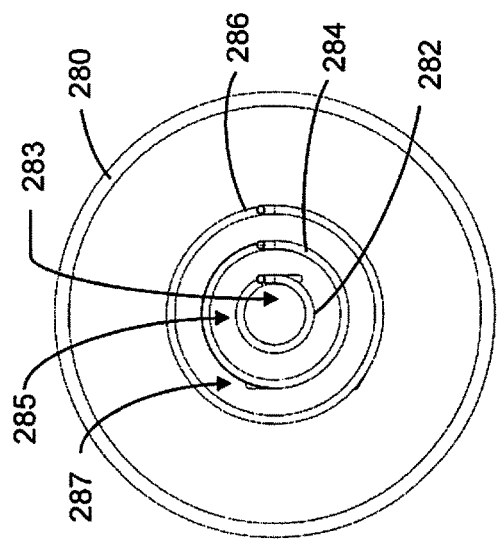
FIG. 30A is a side view of another embodiment of coils of the present invention to provide passageways for fluid from the top reservoir.
FIG. 30B is a perspective view of the cooling cartridge and coils of FIG. 30A.
FIG. 30C is a top view of the coils of FIG. 30.
Figure 30:
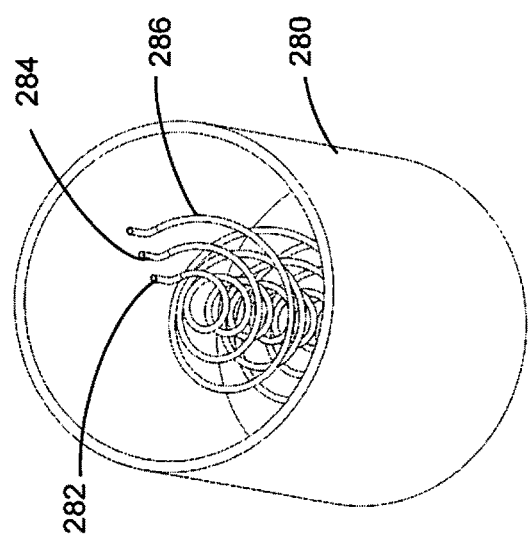
Figure 30:
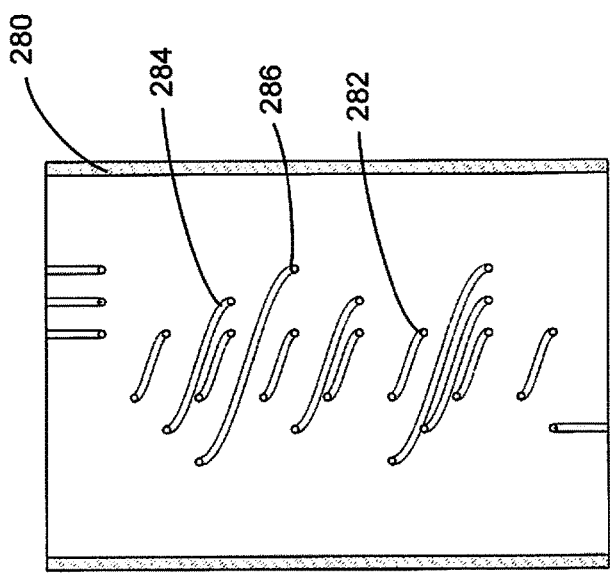

FIGS. 27A and 27B illustrate an embodiment wherein the garnish is contained in cavity 256 of pod 252. The pod 252 includes a top layer such as foil which can be pulled off prior to use and placed in the bottom reservoir 250. The pod can alternatively be opened in other ways to remove the garnish.

Note the pod for containing liquid in the top reservoir and/or the pod or cavity for the garnish can be used with the various embodiments disclosed herein.

Figure 20:
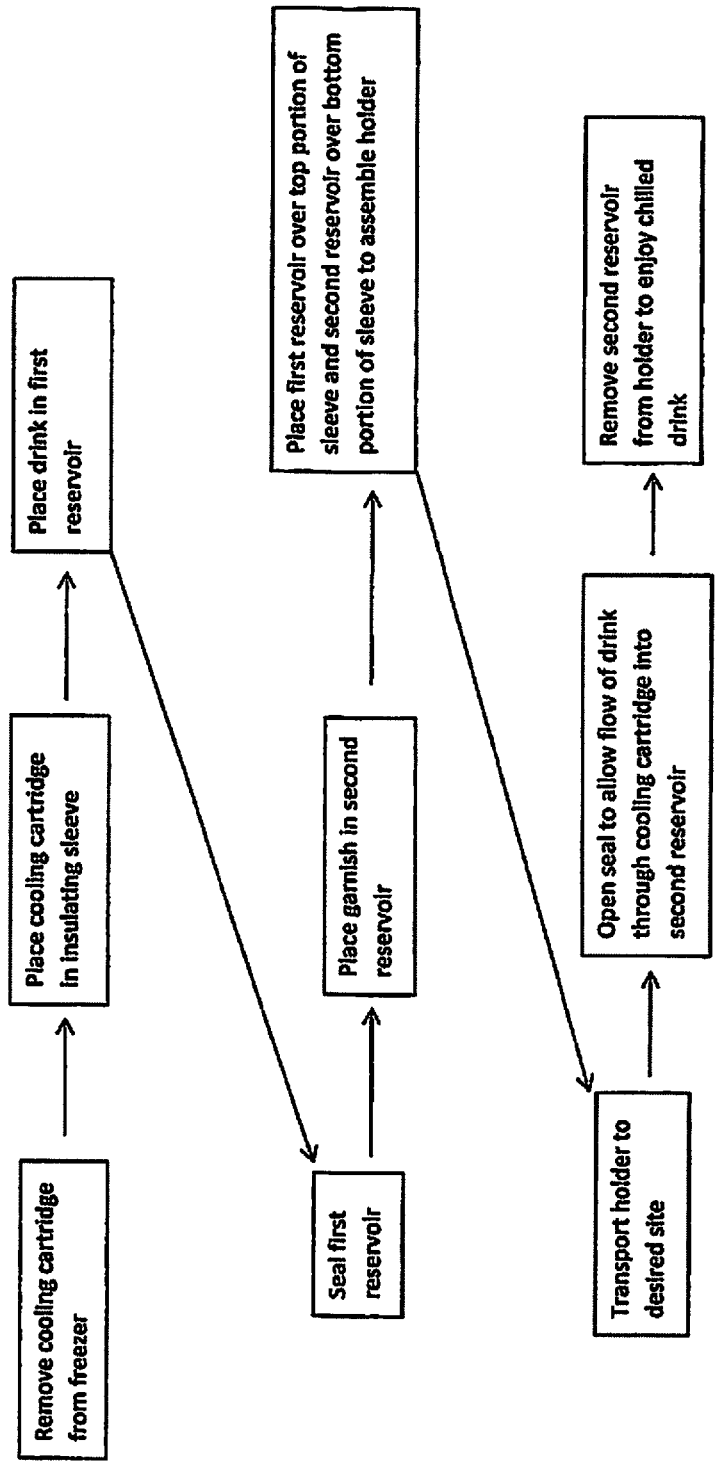
FIG. 20 is a flow chart depicting one method of the present invention.

FIG. 20 provides a flow chart illustrating one method of use of the drink holders of the present invention. It should be appreciated that the steps can be performed in a different order then depicted in the chart, e.g., the garnish can be placed in the second reservoir before placing drink in the first reservoir, the second reservoir can be placed over the sleeve before the first reservoir, etc.

In some embodiments, as noted above, the drink holder (portable shaker) is reusable and can be made of stainless steel, although other materials are also contemplated. It can have a retro-cocktail look and shape and will be able to be used many times. That is, once used, it can be brought back home and washed and the middle cooling section 14 placed back in the freezer to be ready for the next use. It will allow a culture of BYOC. It can be customized with engravings such as monograms, crests, club seals or symbols.

The alternative version incorporates the same design elements as the reusable version, e.g., the top reservoir 12 or 170, middle cooling section 14, and bottom receptacle 20 or 157 to drink from, but is a disposable model. The dimensions can be the same as the reusable, but the materials will allow for this model to be disposable. It can be made out of plastic or other inexpensive material to allow for one time use, i.e., discarded after a single use. The disposable version will fulfill the same purpose to allow a chilled, well-crafted cocktail to be enjoyed at a later time. The shaker can be utilized at sporting events, concerts, and will allow portability of a cocktail. As in the reusable embodiment, the middle section which forms the cooling system will be kept in the freezer and remains in the freezer until ready to be used. The ingredients of the cocktail are then placed in the top reservoir 12 (or 170) and screwed, or otherwise mounted, to the top portion of the middle cooling section. The desired garnish will be placed in the bottom receptacle 16 and screwed or otherwise mounted, to the other end, i.e., the bottom portion of middle portion 14. This will allow for the portable cocktail shaker 10 to travel and to be transported to the desired destination and allow for enjoying a well-crafted, chilled cocktail up to several hours later when ready. When a cocktail is ordered, the ingredients are placed in the top reservoir, the middle cooling section is removed from the freezer, and the portable shaker is assembled and ready to travel. This will also allow a chilled cocktail up to several hours later.

The disposable embodiments can also be used by bars and other establishments. This includes for example bars and restaurants at airports. The patron can purchase the desired cocktail in the portable version and carry it on the plane for later enjoyment while in flight. Such establishments can have the empty, disposable cocktail shakers on hand with the middle chilling section in the freezer. When a patron orders a cocktail to go, it can be prepared and the portable cocktail shaker assembled by the establishment. The patron can then travel to the desired destination and turn the top reservoir to allow the cocktail to flow through the cooling section. After enjoying the cocktail, the assembly is discarded. The portable cocktail shakers can be ready to use at establishments that serve cocktails and expand their ability to serve cocktails to those patrons that want to enjoy them at a later date.

The portable cocktail shaker of the present invention thus has the ability to expand the timeline of the enjoying a well-crafted and chilled cocktail. It will also allow a BYOC culture and allow the classic pre-dinner cocktail while socializing with friends in BYOC restaurants. It can be mixed at home and transported to the restaurant. It will allow enjoyment of a cocktail at sporting and other social events. The cocktail can be prepared and can then be chilled and decanted when comfortably in your seat.

The drink holder of the present invention can in some embodiments be configured to receive a "pre-made" cocktail cup made by a third party vendor that can be attached to or poured into the top reservoir for passage through the cooling medium as described above.

Figure 14:
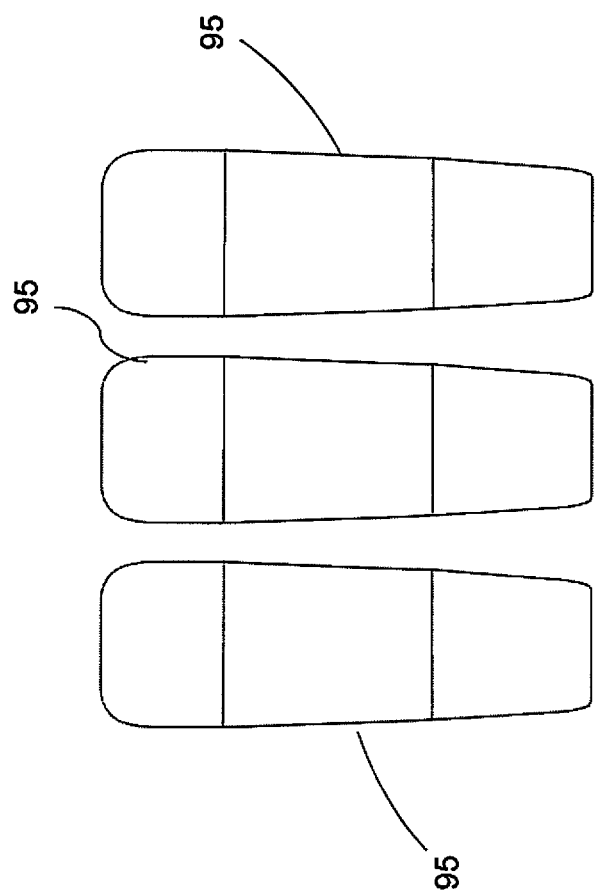
FIG. 14A is a perspective view of another embodiment of the drink holder of the present invention.
FIG. 14B is a perspective view of another embodiment of the drink holder of the present invention.
FIG. 14C is a perspective view of another embodiment of the drink holder of the present invention.
FIG. 14D is a perspective view of another embodiment of the drink holder of the present invention.
Figure 14:
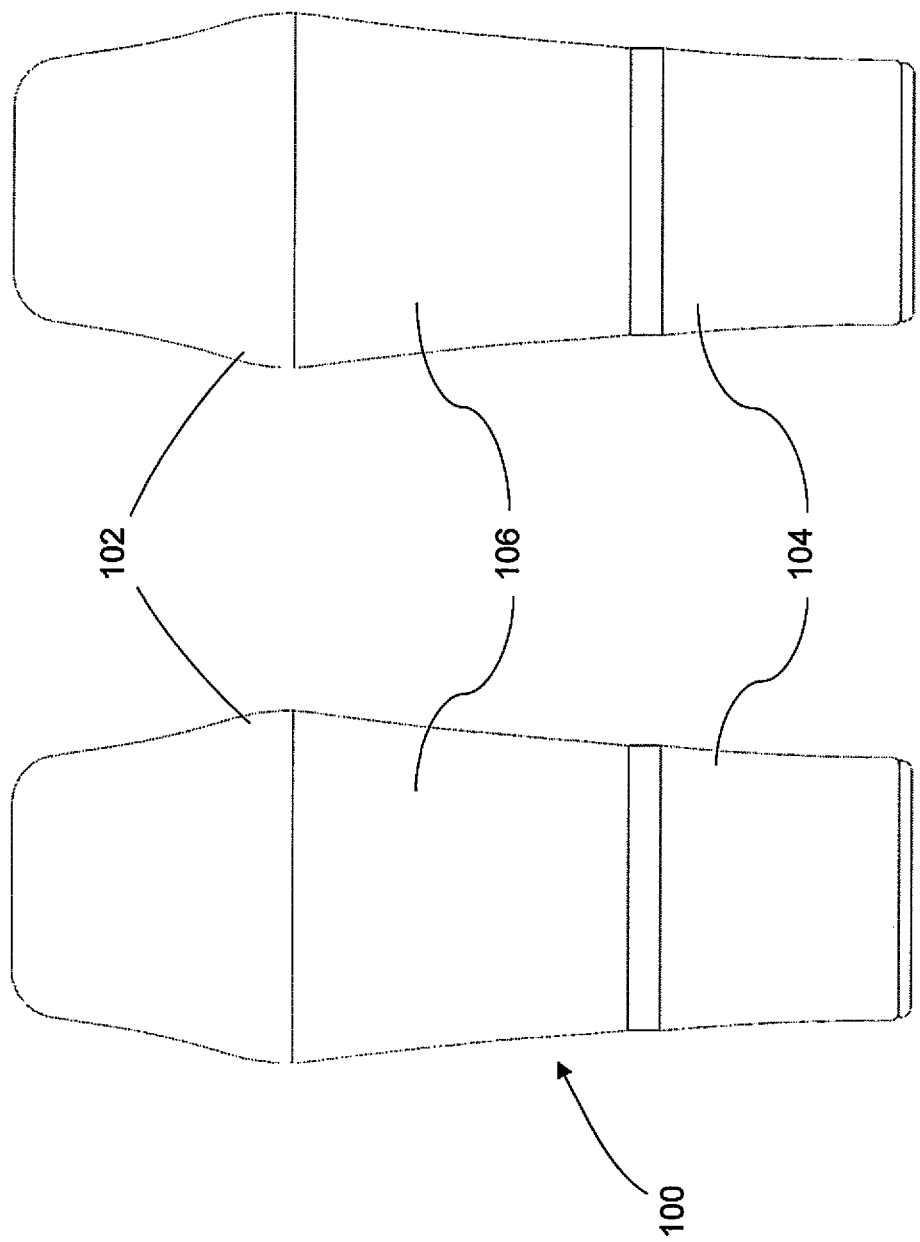
Figure 14:
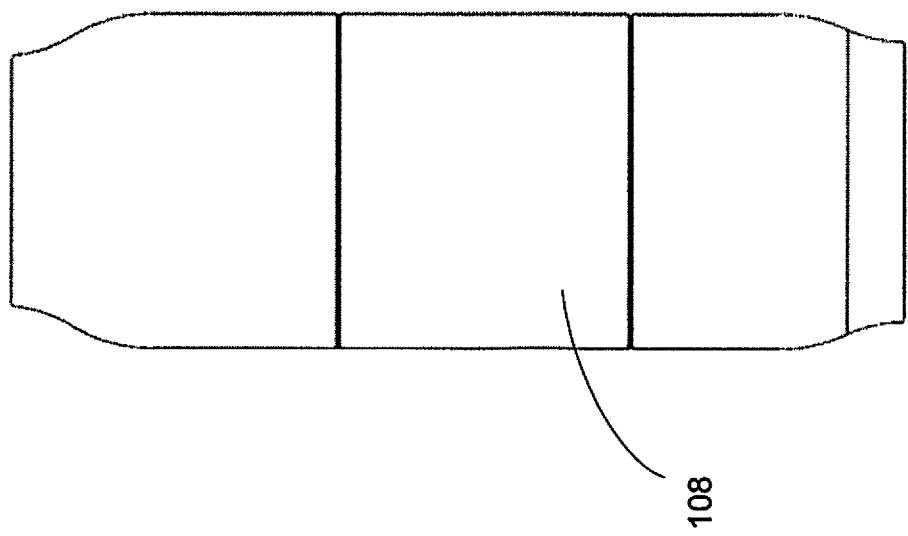

FIGS. 14A-14D illustrate several different embodiments of the drink holder of the present invention. The components, e.g., top and bottom reservoir, cooling cartridge, insulating sleeve, function as in the aforementioned embodiments, the difference being in the shape of the holder. In FIG. 14A, two drink holders 90 are shown side by side, each having a top reservoir 92, cooling cartridge 96 and bottom reservoir 94. In FIG. 14B, the drink holder 95 (three are shown) has a more continuous taper. Drink holder 100 of FIG. 14C has a wider top cartridge 102, sitting atop cooling cartridge assembly 106 which is attached to bottom reservoir 104. Drink holder 108 of FIG. 14D has a less tapered configuration. Other shapes, sizes and configurations for the drink holder are also contemplated.

While the above description contains many specifics, those specifics should not be construed as limitations on the scope of the disclosure, but merely as exemplifications of preferred embodiments thereof. Those skilled in the art will envision many other possible variations that are within the scope and spirit of the disclosure as defined by the claims appended hereto.

What is claimed is:

1. A portable drink holder for a drinkable liquid, the portable drink holder comprising:
    a first removable reservoir for storing the drinkable liquid at a first end of the holder, the liquid having a first temperature;
    a second removable reservoir for receiving the liquid from the first reservoir and in fluid communication with the first reservoir, the second reservoir at a second end of the holder opposite the first end and axially spaced from the first reservoir; and
    a cooling cartridge between the first and second reservoirs and in fluid communication with the first and second reservoirs, the cooling cartridge including a plurality of elongated members having a plurality of independent passageways each with an independent opening in fluid communication with the first reservoir, the passageways providing passage of the drinkable liquid therethrough and a cooling medium so that the drinkable liquid passes through the cooling cartridge and transitions to a second temperature lower than the first temperature as it flows within the holder out from the first reservoir toward and into the second reservoir, wherein the plurality of elongated members extend through the cooling cartridge to a distal region, and the plurality of passageways through the elongated members selectively transport the drinkable liquid from the first reservoir to the second reservoir.

2. The holder of claim 1, wherein the plurality of elongated members are in the form of two or more coils transporting the drinkable liquid from the first reservoir to the second reservoir.

3. The holder of claim 2, wherein the coils are positioned concentrically such that a first of the coils forms an outer coil and a second of the coils forms an inner coil within the outer coil.

4. The holder of claim 1, further comprising an insulating sleeve, the cooling cartridge positioned within the insulating sleeve to limit the temperature rise of the cooling medium.

5. The holder of claim 1, wherein the drinkable liquid in the first reservoir is an alcoholic beverage.

6. The holder of claim 1, wherein the cooling medium is out of contact with the drinkable liquid within the holder.

7. The holder of claim 4, wherein the first reservoir is removably securable to one of the cooling cartridge or the insulating sleeve which is positioned around the cooling cartridge.

8. The holder of claim 4, wherein the second reservoir is removably securable to one of the cooling cartridge or the insulating sleeve which is positioned around the cooling cartridge.

9. The holder of claim 1, further comprising a vent for venting the first reservoir during flow of the liquid from the first reservoir.

10. The holder of claim 1, wherein the cooling medium is a gel concentrate having a temperature of zero degrees or less, and the gel concentrate maintains a temperature transition from the first reservoir to the second reservoir so the temperature transitions from about 65-75 degrees Fahrenheit to about 25 to about 35 degrees Fahrenheit.

11. The holder of claim 1, wherein the holder can be inverted to pass the drinkable liquid from the second reservoir back through the cooling cartridge into the first reservoir to further lower the temperature of the drinkable liquid.

12. The holder of claim 1, wherein the first reservoir has a seal, the seal preventing passage of the liquid from the first reservoir into the cooling cartridge, the seal selectively openable to allow passage from the first reservoir into the cooling cartridge.

13. The holder of claim 12, wherein the seal includes a push button mechanism pressable to unseal and pressable to reseal the first reservoir.

14. The holder of claim 1, wherein the liquid is contained within a pod in the first reservoir, the pod puncturable to enable the liquid to flow out of the first reservoir.

15. The holder of claim 14, wherein the pod is donut shape and has a bottom cover composed of penetrable material so that a sealing mechanism is movable to puncture the material.

16. The holder of claim 1, wherein the second reservoir includes an insulator to maintain a temperature of the second liquid in the second reservoir.

17. A method for cooling a drinkable liquid in situ comprising the steps of:
provproviding a holder having a longitudinal axis, a first removable reservoir for storing the drinkable liquid, a second removable reservoir for receiving the drinkable liquid axially spaced from the first reservoir and in fluid communication with and axially aligned with the first reservoir and a cooling cartridge containing a cooling medium interposed along the longitudinal axis between the first and second reservoirs, the cooling cartridge including a plurality of elongated members having a plurality of independent passageways each with an independent opening;
enabling flow of the drinkable liquid from the first reservoir through the plurality of independent passageways extending through the cooling cartridge to a distal region of the cooling cartridge and into the second reservoir to lower the temperature of the drinkable liquid; and
removing the second reservoir from the holder to expose a receptacle in the second reservoir for drinking of the drinkable liquid.

18. The method of claim 17, further comprising the step of venting the first reservoir when the seal is open and the liquid flows from the first reservoir.

19. The method of claim 17, wherein the step of further cooling the drinkable liquid includes passing the drinkable liquid from the second reservoir back through the cooling system and into the first reservoir.

* * * * *